(12) United States Patent (10) Patent No.: US 12,603,365 B2
Xu et al. (45) Date of Patent: Apr. 14, 2026

(54) BATTERY CASE, BATTERY, AND ELECTRONIC DEVICE

(71) Applicant: ZHUHAI COSMX BATTERY CO., LTD., Zhuhai (CN)

(72) Inventors: Desheng Xu, Zhuhai (CN); Yongwang Wang, Zhuhai (CN); Zhida Wei, Zhuhai (CN); Yuxiang Zeng, Zhuhai (CN); Longyun Chen, Zhuhai (CN); Hongkai Lin, Zhuhai (CN); Ning Peng, Zhuhai (CN); Bin Xie, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 774 days.

(21) Appl. No.: 17/929,709

(22) Filed: Sep. 4, 2022

(65) Prior Publication Data

US 2022/0416337 A1 Dec. 29, 2022

Related U.S. Application Data

(63) Continuation of application No. PCT/CN2021/078680, filed on Mar. 2, 2021.

(30) Foreign Application Priority Data

| Mar. 18, 2020 | (CN) | .......................... 202020339309.4 |
| Jul. 8, 2020 | (CN) | .......................... 202021331670.9 |
| Feb. 23, 2021 | (CN) | .......................... 202110201053.X |

(51) Int. Cl.
*H01M 50/169* (2021.01)
*H01M 50/107* (2021.01)
(Continued)

(52) U.S. Cl.
CPC ....... *H01M 50/169* (2021.01); *H01M 50/107* (2021.01); *H01M 50/109* (2021.01); *H01M 50/143* (2021.01)

(58) Field of Classification Search
CPC ......... H01M 10/02–04; H01M 10/0422–0427; H01M 50/10–102; H01M 50/107–109;
(Continued)

(56) References Cited

U.S. PATENT DOCUMENTS

| 7,341,802 | B1 | 3/2008 | Ota et al. |
| 11,862,806 | B2 | 1/2024 | Peng |

(Continued)

FOREIGN PATENT DOCUMENTS

| CN | 2833898 Y | 11/2006 |
| CN | 102428591 A | 4/2012 |

(Continued)

OTHER PUBLICATIONS

Machine translation of Huang et al., CN 109192889. Originally available Jan. 11, 2019 (Year: 2019).*

(Continued)

*Primary Examiner* — Nicole M. Buie-Hatcher
*Assistant Examiner* — Jacob Buchanan
(74) *Attorney, Agent, or Firm* — Kilpatrick Townsend & Stockton LLP

(57) ABSTRACT

A battery case, a battery, and an electronic device include a case body, a first cover body, a first insulating part, and a second cover body, where the case body includes a bottom wall and a side wall connected to the bottom wall; the first cover body includes a first surface and a second surface disposed opposite to each other; the second cover body includes a third surface and a fourth surface disposed opposite to each other; the first surface of the first cover body is connected to one end of the side wall away from the bottom wall, and the second surface of the first cover body is connected to the third surface of the second cover body by the first insulating part.

11 Claims, 8 Drawing Sheets

(51) Int. Cl.
_H01M 50/109_ (2021.01)
_H01M 50/143_ (2021.01)

(58) Field of Classification Search
CPC ........... H01M 50/14–143; H01M 50/147–148;
H01M 50/153; H01M 50/166–171
See application file for complete search history.

(56) References Cited

U.S. PATENT DOCUMENTS

| | | | | |
|---|---|---|---|---|
| 2002/0142216 | A1 | 10/2002 | Skoumpris | |
| 2003/0211388 | A1 | 11/2003 | Ruth et al. | |
| 2006/0099502 | A1 | 5/2006 | Kim et al. | |
| 2007/0117011 | A1 | 5/2007 | Myerberg et al. | |
| 2012/0321937 | A1 | 12/2012 | Hutzler et al. | |
| 2015/0047180 | A1 | 2/2015 | Schmidt et al. | |
| 2017/0170450 | A1 | 6/2017 | Guen | |
| 2017/0207491 | A1 | 7/2017 | Tamachi et al. | |
| 2018/0145289 | A1* | 5/2018 | Yu | H01M 50/591 |
| 2021/0075051 | A1* | 3/2021 | Zhou | H01M 50/446 |
| 2021/0242438 | A1* | 8/2021 | Lee | H01M 50/147 |
| 2021/0367310 | A1* | 11/2021 | Tang | H01M 50/213 |
| 2021/0408626 | A1 | 12/2021 | Ko et al. | |
| 2024/0088494 | A1 | 3/2024 | Peng | |
| 2024/0120586 | A1 | 4/2024 | Peng | |

FOREIGN PATENT DOCUMENTS

| | | | | | |
|---|---|---|---|---|---|
| CN | 106159350 | A | | 11/2016 | |
| CN | 108023037 | A | | 5/2018 | |
| CN | 108172700 | A | | 6/2018 | |
| CN | 109192889 | A | * | 1/2019 | .......... H01M 50/147 |
| CN | 110459705 | A | * | 11/2019 | ........ H01M 10/0427 |
| CN | 209804717 | U | | 12/2019 | |
| CN | 110880566 | A | * | 3/2020 | .......... H01M 50/107 |
| CN | 211238301 | U | | 8/2020 | |
| CN | 111613739 | A | | 9/2020 | |
| CN | 111755633 | A | | 10/2020 | |
| CN | 111900274 | A | | 11/2020 | |
| CN | 111900275 | A | | 11/2020 | |
| CN | 111900276 | A | | 11/2020 | |
| CN | 212434725 | U | | 1/2021 | |
| EP | 3920298 | A1 | | 12/2021 | |
| EP | 3940877 | A1 | | 1/2022 | |
| KR | 20070006250 | A | * | 1/2007 | .......... H01M 50/147 |

| | | | |
|---|---|---|---|
| WO | 2021185074 | A1 | 9/2021 |
| WO | 2021244272 | A1 | 12/2021 |
| WO | 2021244618 | A1 | 12/2021 |

OTHER PUBLICATIONS

Machine translation of Woo, KR 2007-0006250. Originally available Jan. 11, 2007. (Year: 2007).*
Notice of Allowance received in the corresponding Chinese application 202110201053.X, mailed May 29, 2023.
The extended European search report received in the corresponding European Application 21770741.3, mailed Jul. 18, 2023.
Non-Final Office Action received in the corresponding U.S. Appl. No. 17/127,252, mailed Nov. 28, 2022.
International Search Report and Written Opinion mailed in International Application PCT/CN2021/078680 on Apr. 29, 2021.
The first office action received in the corresponding Chinese application 202110201053.X, issued Oct. 11, 2021.
The second office action received in the corresponding Chinese application 202110201053.X, issued Feb. 16, 2022.
The Notice of Allowance received in the corresponding Chinese application 202021331670.9, issued Nov. 24, 2020.
The Notice of Rejection received in the corresponding Chinese application 202110201053.X, issued Apr. 6, 2022.
The European Search Report received in the corresponding European application 20217378.7, issued Jun. 17, 2021.
The first office action received in the corresponding European application 20217378.7, issued Jan. 26, 2022.
The second office action received in the corresponding European application 20217378.7, issued Jul. 28, 2022.
The first office action received in the corresponding U.S. Appl. No. 17/127,252, issued Mar. 4, 2022.
The second office action received in the corresponding U.S. Appl. No. 17/127,252, issued Jun. 28, 2022.
Office Action of the Corresponding U.S. Appl. No. 18/512,145 Dated Aug. 8, 2024.
Office Action of the Corresponding U.S. Appl. No. 18/512,103 Dated Aug. 8, 2024.
Notice of Allowance received in the counterpart U.S. Appl. No. 17/127,252, mailed Aug. 30, 2023.
The extended European search report received in the corresponding European Application 23177530.5, mailed Sep. 15, 2023.
The extended European search report received in the corresponding European Application 23177520.6, mailed Sep. 15, 2023.

* cited by examiner

BATTERY CASE, BATTERY, AND ELECTRONIC DEVICE

CROSS-REFERENCE TO RELATED APPLICATIONS

The present application is a continuation of International Application No. PCT/CN2021/078680, filed on Mar. 2, 2021, which claims priority to Chinese Patent Application No. 202021331670.9 filed with the China National Intellectual Property Administration on Jul. 8, 2020 and entitled "Button battery and electronic device", Chinese Patent Application No. 202110201053.X filed with the China National Intellectual Property Administration on Feb. 23, 2021 and entitled "Battery case and battery", and Chinese Patent Application No. 202020339309.4 filed with the China National Intellectual Property Administration on Mar. 18, 2020 and entitled "Sealed case body structure and battery". The disclosures of the aforementioned applications are hereby incorporated by reference in their entireties.

TECHNICAL FIELD

The present application relates to battery technology, and particularly relates to a battery case, a battery, and an electronic device.

BACKGROUND

Button batteries, also known as button type batteries, are batteries that are shaped like small buttons, and are generally larger in diameter and thinner in thickness. The button batteries, because of the small size thereof, are widely used in various miniature electronic products such as wearable devices: wireless headphones, sports watches, wristbands, rings and other electronic products. Since the batteries have an interior that is a closed space, the sealing property is extremely important for batteries.

At present, a button battery includes a cylinder case body and a cylinder case cover disposed to cover the outside of the cylinder case body, and a sealing ring is annularly disposed between an outer wall of the case body and an inner wall of the case cover. In order to achieve the sealing between the case body and the case cover, the three of them are generally sealed by interference fit.

However, the sealing property of the battery made by interference fit between the case body, the sealing ring, and the case cover is poor.

SUMMARY

The present application provides a battery case, a battery, and an electronic device, solving the technical problem that the sealing property of a battery made by interference fit between a case body, a sealing ring, and a case cover is poor.

The first aspect of the present application provides a battery case, including: a case body, a first cover body, a first insulating part, and a second cover body, where the case body includes a bottom wall and a side wall connected to the bottom wall; the first cover body includes a first surface and a second surface disposed opposite to each other; the second cover body includes a third surface and a fourth surface disposed opposite to each other; the first surface of the first cover body is connected to one end of the side wall away from the bottom wall, and the second surface of the first cover body is connected to the third surface of the second cover body by the first insulating part; the first cover body is provided with a first through hole, and the first insulating part is provided with a second through hole corresponding to the first through hole.

The battery case is configured to wrap an outside of a battery cell, the first cover body is a metal ring, the first insulating part is an insulating ring, and the second cover body is a metal sheet; the side wall is an annular side wall, a bottom end of the side wall is connected to the bottom wall, and a top end of the side wall has an opening;

an end surface of a bottom end of the first cover body is connected to an end surface of the opening, an area enclosed by an inner edge of the first cover body is the first through hole, an area enclosed by an inner edge of the first insulating part is the second through hole, and the first through hole at least partially overlaps with the second through hole;

an annular groove or a convex rib is annularly disposed on an end surface of one side of the second cover body facing the first cover body, and the annular groove or the convex rib is located at an area that the second through hole faces.

The battery case further includes a second welding point, the second cover body is configured to be welded with a tab of the battery cell to form the second welding point, and the second welding point faces an area enclosed by an inner edge of the annular groove or the convex rib.

A projection of the inner edge of the first cover body on the bottom wall is located within a projection of the first insulating part on the bottom wall.

An outer diameter of the first insulating part is greater than or equal to an outer diameter of the first cover body; and/or, the outer diameter of the first insulating part is greater than or equal to an outer diameter of the second cover body.

A distance between the annular groove or the convex rib and a center of the second cover body is greater than or equal to 2 mm and less than or equal to 14 mm.

The annular groove or the convex rib has a width greater than or equal to 0.05 mm and less than or equal to 2 mm; a depth of the annular groove or a height of the convex rib is greater than or equal to 0.02 mm and less than or equal to 0.4 mm.

The bottom wall is a conical surface or a spherical surface.

The conical surface or the spherical surface has a height greater than or equal to 0.05 millimeter.

The battery case is provided with at least one explosion-proof groove on at least one of the following positions:

a fifth surface of the bottom wall of the case body, the fifth surface is a surface of the bottom wall facing outwards;

a sixth surface of the side wall of the case body, the sixth surface is a surface of the side wall facing outwards;

the fourth surface of the second cover body.

When the at least one explosion-proof groove is disposed on the fifth surface of the bottom wall of the case body:

the at least one explosion-proof groove has a length of 0.2 times to 0.8 times a diameter of the bottom wall, the at least one explosion-proof groove has a width of 0.2 times to 0.8 times the diameter of the bottom wall, and the at least one explosion-proof groove has a depth of 0.2 times to 0.8 times a thickness of the bottom wall.

When the at least one explosion-proof groove is disposed on the sixth surface of the side wall of the case body:

the at least one explosion-proof groove extends in a thickness direction of the case body; the at least one explosion-proof groove has a length of 0.2 times to 0.8 times a thickness of the case body, the at least one explosion-proof groove has a width of 0.003 times to 0.2 times a perimeter of the side wall, and the at least one explosion-proof groove has a depth of 0.2 times to 0.8 times a thickness of the side wall.

When the at least one explosion-proof groove is disposed on the fourth surface of the second cover body:

the at least one explosion-proof groove has a length of 0.2 times to 0.8 times a diameter of the second cover body, the at least one explosion-proof groove has a width of 0.2 times to 0.8 times the diameter of the second cover body, the at least one explosion-proof groove has a depth of 0.2 times to 0.8 times a thickness of the second cover body.

The case body is welded or soldered with the first cover body.

The first cover body is welded, soldered, or injection molded with the first insulating part; the second cover body is welded, soldered, or injection molded with the first insulating part.

The inner edge of the first insulating part is covered with an annular adhesive dispense layer, and the inner edge of the first insulating part is sealed with the first cover body and the second cover body by the adhesive dispense layer.

The first cover body has an outer diameter greater than or equal to 8 mm and less than or equal to 16 mm;

a distance between the inner edge of the first cover body and a center of the first cover body is greater than or equal to 3 mm and less than or equal to 14 mm;

the first cover body has a thickness greater than or equal to 0.05 mm and less than or equal to 0.5 mm.

The first insulating part has an outer diameter greater than or equal to 8 mm and less than or equal to 16 mm;

a distance between the inner edge of the first insulating part and a center of the first insulating part is greater than or equal to 2 mm and less than or equal to 14 mm;

the first insulating part has a thickness greater than or equal to 0.05 mm and less than or equal to 0.5 mm.

The second cover body has a diameter greater than or equal to 6 mm and less than or equal to 16 mm;

the second cover body has a thickness greater than or equal to 0.05 mm and less than or equal to 0.5 mm.

The second aspect of the present application provides a battery, at least including: a battery cell and the battery case of the first aspect described above, and the battery case wraps the outside of the battery cell.

The battery cell includes a first tab and a second tab, the first tab is connected to the first surface of the first cover body, and the second tab is connected to the third surface of the second cover body.

The third aspect of the present application provides a battery, including an encapsulating case, a battery cell, and a second cover body;

an accommodating cavity for accommodating the battery cell is disposed in the encapsulating case, a hollow cavity coaxial with the battery cell is formed in the battery cell, the encapsulating case is provided with a hole communicating with the accommodating cavity, the hole is coaxial with the hollow cavity, the second cover body covers on the hole, and a first insulating part is disposed between the second cover body and the encapsulating case;

the second cover body is a conductive part, and the first insulating part is a sealing rubber ring.

The second cover body is provided with a protruding portion protruding toward the accommodating cavity, a first adhesive-overflowing groove is formed between the protruding portion and an edge of the hole, and the first adhesive-overflowing groove has a width of 0.1-3 mm in a radial direction of the battery cell.

The encapsulating case is provided with an accommodating groove, the second cover body is located in the accommodating groove, a second adhesive-overflowing groove is formed between an outer edge of the second cover body and a side groove wall of the accommodating groove, and the second adhesive-overflowing groove has a width of 0.1-3 mm in a radial direction of the battery cell.

A first insulating adhesive layer is disposed between a lower end surface of the battery cell and an inner wall of a bottom wall of the encapsulating case, and the first insulating adhesive layer is provided with a third through hole that is coaxial with the hollow cavity.

An aperture of the third through hole is greater than a diameter of the hollow cavity.

The aperture of the third through hole is greater than the diameter of the hollow cavity by 0-0.5 mm.

A second insulating adhesive layer is disposed between an upper end surface of the battery cell and an inner top wall of the encapsulating case, and the second insulating adhesive layer is provided with a fourth through hole that is coaxial with the hollow cavity.

An aperture of the fourth through hole is greater than the diameter of the hollow cavity.

The aperture of the fourth through hole is greater than the diameter of the hollow cavity by 0-0.5 mm.

The encapsulating case includes a case body and a first cover body, the first cover body is sealingly connected to the case body, the case body and the first cover body are enclosed to form the accommodating cavity for accommodating the battery cell, and the first cover body is provided with the hole communicating with the accommodating cavity;

the battery cell is provided with a first tab and a second tab, the first tab is electrically connected to an inner wall of a bottom wall of the case body, and the second tab is electrically connected to the second cover body;

a third insulating adhesive layer is disposed between the second tab and the first cover body;

the edge of the hole is enclosed to form a first through hole.

The third insulating adhesive layer is attached to an inner wall of the first cover body, and in the radial direction of the battery cell, an outer edge of the third insulating adhesive layer is smaller than an outer edge of the first cover body;

the third insulating adhesive layer is provided with a fifth through hole, the fifth through hole is coaxial with the hollow cavity, and an aperture of the fifth through hole is smaller than a size of the hole in a radial direction.

In the radial direction of the battery cell, a size of the outer edge of the third insulating adhesive layer is smaller than a size of an edge of the first cover body by 0.05-2 mm;

the aperture of the fifth through hole is smaller than the size of the hole in the radial direction by 0-2 mm.

The third insulating adhesive layer is attached to one side of the second tab close to the first cover body, and in the radial direction of the battery cell, a distance from an edge of the third insulating adhesive layer to an axis center of the battery cell is smaller than a distance from the hole to the axis center of the battery cell.

A recessed welding mark is disposed on a surface of the first tab facing the battery cell, and the welding mark is located in an area corresponding to the third through hole and the hollow cavity.

An outside of the bottom wall of the case body is a smooth plane or arc surface.

The welding mark has a depth of 20-200 μm; or a first soldering point formed after welding has a height of 10-120 μm.

A sealing adhesive is further disposed in the second adhesive-overflowing groove, and the sealing adhesive is configured to seal a gap between the second cover body and the encapsulating case.

The fourth aspect of the present application provides an electronic device, at least including: an electronic device body and the battery of the above first aspect, second aspect, and third aspect, and the battery supplies electrical energy to the electronic device body.

The battery case, the battery, and the electronic device provided by the present application includes: a case body, a first cover body, a first insulating part, and a second cover body, where the case body includes a bottom wall and a side wall connected to the bottom wall; the first cover body includes a first surface and a second surface disposed opposite to each other; the second cover body includes a third surface and a fourth surface disposed opposite to each other; the first surface of the first cover body is connected to one end of the side wall away from the bottom wall, and the second surface of the first cover body is connected to the third surface of the second cover body by the first insulating part; the first cover body is provided with a first through hole, and the first insulating part is provided with a second through hole corresponding to the first through hole. A structure that the case body, the first cover body, the first insulating part, and the second cover body are connected in sequence can improve the overall sealing property of the battery. Therefore, the battery case, the battery, and the electronic device provided by the present application solve the technical problem that the sealing property of the battery made by interference fit between the case body, the sealing ring, and the case cover is poor.

DESCRIPTION OF REFERENCE NUMBERS

Figure 1:
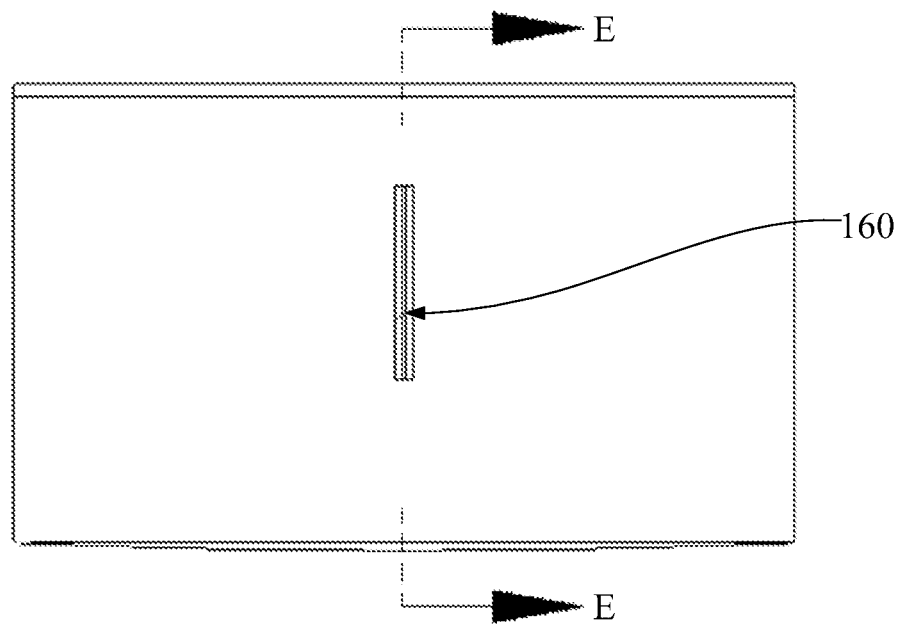
FIG. 1 is a front view of a battery case provided by an embodiment 1 of the present application.

1: encapsulating case; 10: case body; 110: first cover body;

111: first through hole; 120: first insulating part; 121: second through hole;

130: second cover body; 131: protruding portion; 132: liquid injection port;

133: annular groove; 140: bottom wall; 150: side wall;

160: explosion-proof groove; 20: battery cell; 210: first tab;

220: second tab; 221: second soldering point; 230: hollow cavity;

30: first adhesive-overflowing groove; 40: second adhesive-overflowing groove; 50: first insulating adhesive layer;

501: third through hole; 502: first cutting edge; 60: second insulating adhesive layer;

601: fourth through hole; 602: second cutting edge; 70: third insulating adhesive layer;

701: fifth through hole; 80: sealing nail.

DESCRIPTION OF EMBODIMENTS

The terms used in the part of embodiments of the present application are used only for explaining the specific embodiments of the present application, and are not intended to limit the present application.

Button batteries, also known as batteries, are batteries that are shaped like small buttons, and are generally larger in diameter and thinner in thickness. The button batteries, because of the small size thereof, are widely used in various miniature electronic products such as wearable devices: wireless headphones, sports watches, wristbands, rings and other electronic products. Since the batteries have an interior that is a closed space, the sealing property is extremely important for batteries.

In the related art, a battery includes a cylinder case body and a cylinder case cover disposed to cover the outside of the cylinder case body, and a sealing ring is annularly disposed between an outer wall of the case body and an inner wall of the case cover. In order to achieve the sealing between the case body and the case cover, the three of them are generally sealed by interference fit.

However, the sealing property of the battery made by interference fit between the case body, the sealing ring, and the case cover is poor.

Based on the above problem, the embodiments of the present application provide a battery case, a battery, and an electronic device. A structure that a first cover body is connected to a second cover body by a first insulating part makes the sealing property of the battery case stronger. When used for battery assembling, the battery case can improve the sealing property of the battery, and improve battery performance.

Embodiment 1

As shown in FIGS. 1 to 4, the embodiment 1 of the present application provides a battery case, and the battery case includes: a case body 10, a first cover body 110, a first insulating part 120, and a second cover body 130.

The case body 10 includes a bottom wall 140 and a side wall 150 connected to the bottom wall 140; the first cover body 110 includes a first surface and a second surface disposed opposite to each other; the second cover body 130 includes a third surface and a fourth surface disposed opposite to each other; the first surface of the first cover body 110 is connected to one end of the side wall 150 away from the bottom wall 140, and the second surface of the first cover body 110 is connected to the third surface of the second cover body 130 by the first insulating part 120; the first cover body 110 is provided with a first through hole, and the first insulating part 120 is provided with a second through hole corresponding to the first through hole.

It can be understood that the first surface is a surface of the first cover body 110 facing the bottom wall 140, and the second surface is a surface of the first cover body 110 facing away from the bottom wall 140; the third surface is a surface of the second cover body 130 facing the bottom wall 140, and the fourth surface is a surface of the second cover body 130 facing away from the bottom wall 140.

The first insulating part 120 may be a rubber ring, and may also be an insulating rubber ring or a connecting part made of other insulating materials; the case body 10, the first cover body 110, and the second cover body 130 are made of metal conductive materials such as an aluminum-manganese alloy, etc., which is not limited herein.

Figure 2:
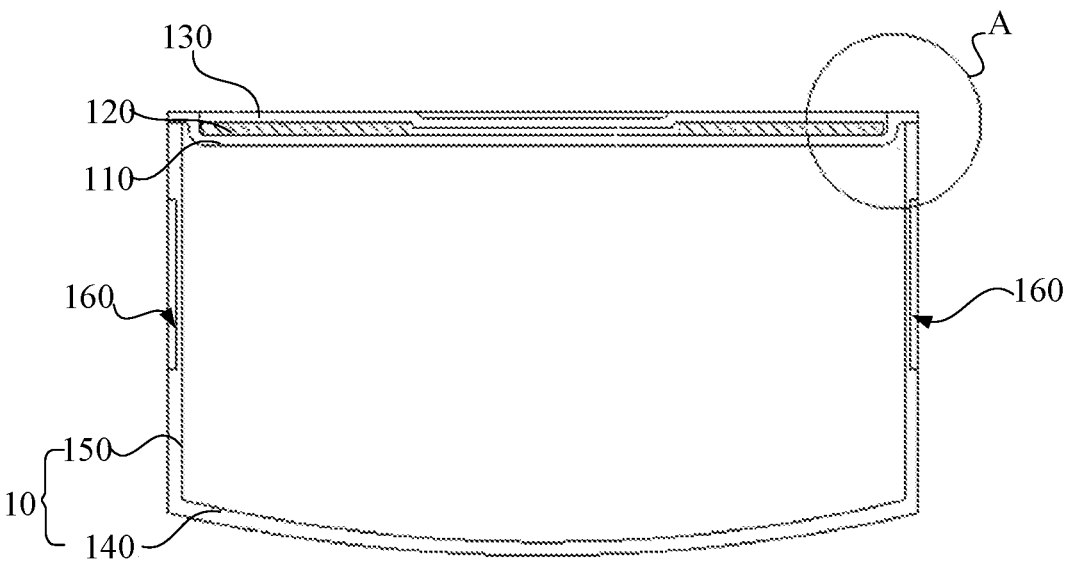
FIG. 2 is a cross-sectional view taken along the E-E in FIG. 1.
Figure 3:
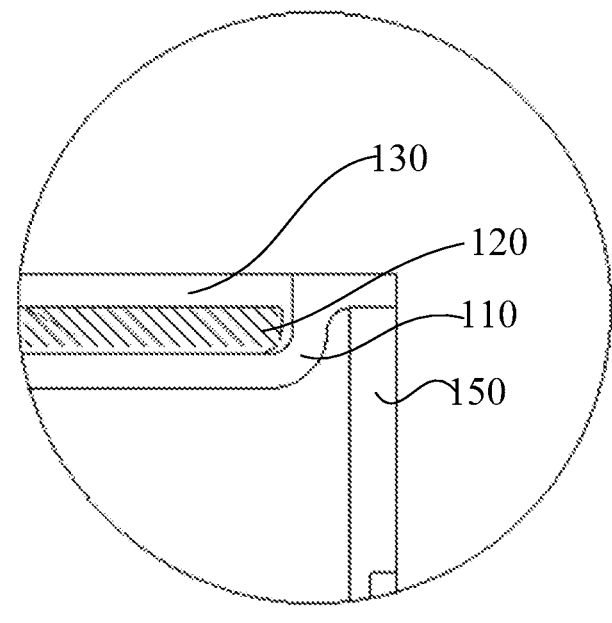
FIG. 3 is a partial enlarged view of the battery case provided by the embodiment 1 of the present application.

In this embodiment, the battery case may be used for battery assembling. As shown in FIGS. 2 and 3, the case body 10 includes the bottom wall 140 and the side wall 150 connected to the bottom wall 140; the second surface of the first cover body 110 is connected to the third surface of the second cover body 130 by the first insulating part 120; the first cover body 110 is provided with the first through hole, and the first insulating part 120 is provided with the second through hole corresponding to the first through hole. When the battery case is used in the assembling of a battery, a battery cell 20 is placed in the case body 10 and an electrolyte solution is injected, then the case body 10 is covered by the first cover body 110 to achieve the sealing of the battery case, meanwhile a tab of the battery cell 20 may protrude in sequence from the first through hole of the first cover body 110 and the second through hole of the first insulating part 120 to be connected to the third surface of the second cover body 130. On one hand, the structure of the first cover body 110, the first insulating part 120, and the second cover body 130 can improve the overall sealing property of the battery case; on the other hand, one tab of the battery cell 20 may be connected to the first cover body 110, and another tab of the battery cell 20 may protrude in sequence from the first through hole of the first cover body 110 and the second through hole of the first insulating part 120 to be connected to the third surface of the second cover body 130. Since the second cover body 130 and the first cover body 110 are in insulated separation by the first insulating part 120, it may ensure the insulation between the two tabs of the battery cell 20 to prevent positive and negative electrodes from short circuit.

In this embodiment, the battery case includes: the case body 10, the first cover body 110, the first insulating part 120, and the second cover body 130, where the case body 10 includes the bottom wall 140 and the side wall 150 connected to the bottom wall 140; the first cover body 110 includes the first surface and the second surface disposed opposite to each other; the second cover body 130 includes the third surface and the fourth surface disposed opposite to each other; the first surface of the first cover body 110 is connected to one end of the side wall 150 away from the bottom wall 140, and the second surface of the first cover body 110 is connected to the third surface of the second cover body 130 by the first insulating part 120; the first cover body 110 is provided with the first through hole, and the first insulating part 120 is provided with the second through hole corresponding to the first through hole. The structure that the first cover body is connected to the second cover body by the first insulating part outside makes the sealing property of the battery case stronger. When used for battery assembling, the battery case can improve the sealing property of the battery, and improve battery performance.

Optionally, as shown in FIG. 2, the bottom wall 140 is a conical surface or a spherical surface.

In this embodiment, the bottom wall 140 is a conical surface or a spherical surface. For battery cases of the same size, the bottom wall of a conical surface or a spherical surface, compared to a bottom wall of a flat surface, has an internal space higher in the thickness direction, so that when the battery case is used for battery assembling, there is more space for accommodating a battery electrolyte solution besides the space occupied by the thickness of the tabs. This increases the preservation amount of the electrolyte solution, and improves battery performance.

Further, the conical surface or the spherical surface has a height greater than or equal to 0.05 millimeter.

In this embodiment, when the battery case is used for battery assembling, especially for lithium-ion battery assembling, the conical surface or the spherical surface of the bottom wall 140 has a height greater than or equal to 0.05 millimeter. Relative to the overall size of the battery case, an internal space is increased to a certain proportion in the thickness direction, and when the battery case is used for battery assembling, the space for accommodating the battery electrolyte solution is further increased, the preservation amount of the electrolyte solution is further increased, and the battery performance is further improved.

Figure 4:
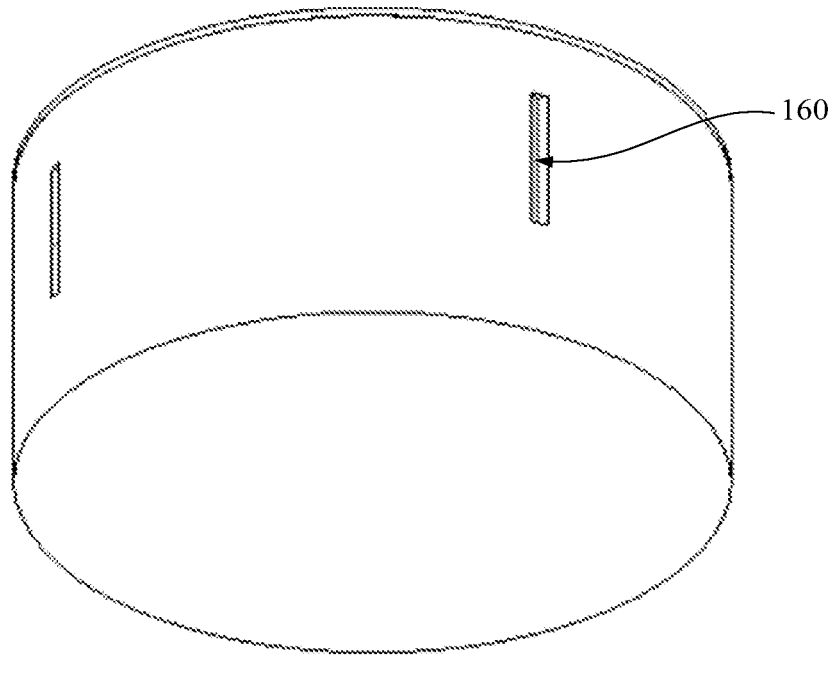
FIG. 4 is a schematic diagram of the appearance of the battery case provided by the embodiment 1 of the present application.

Optionally, as shown in FIG. 1, FIG. 3, and FIG. 4, the battery case is provided with at least one explosion-proof groove 160 at at least one of the following positions:

a fifth surface of the bottom wall 140 of the case body 10, the fifth surface is a surface of the bottom wall 140 facing outwards;

a sixth surface of the side wall 150 of the case body 10, the sixth surface is a surface of the side wall 150 facing outwards; and the fourth surface of the second cover body 130.

In this embodiment, the battery case may be provided with at least one explosion-proof groove 160, the explosion-proof groove 160 may be disposed on the surface of the bottom wall 140 of the case body 10 facing outwards, may also be disposed on the surface of the side wall 150 of the case body 10 facing outwards, and may further be disposed on the fourth surface of the second cover body 130, that is, on the surface facing away from the case body 10.

As shown in FIGS. 1 and 4, at least one explosion-proof groove 160 may be in the shape of a straight line, the straight-line shape is one of common groove shapes. The explosion-proof groove 160 may also be disposed as a cross shape formed by two grooves of straight-line shape, or other shapes, which is not limited herein.

When the battery case is used for battery assembling, the electrolyte solution inside the working battery generates chemical reactions, which will release gas, and especially when the interior of the battery is short-circuited, the released gas has a higher concentration, and the internal gas pressure will be larger. The provision of the explosion-proof groove 160 on the battery case can relieve the pressure of the high pressure gas inside the battery case against the case body 10, and prevent the case body 10 from cracking or even exploding to endanger safety due to the high gas pressure inside the case body 10.

Further, when at least one explosion-proof groove 160 is disposed on the fifth surface of the bottom wall 140 of the case body 10, the at least one explosion-proof groove 160 has a length of 0.2 times to 0.8 times the diameter of the bottom wall 140, the at least one explosion-proof groove 160 has a width of 0.2 times to 0.8 times the diameter of the bottom wall 140, and the at least one explosion-proof groove 160 has a depth of 0.2 times to 0.8 times the thickness of the bottom wall 140.

In this embodiment, when the at least one explosion-proof groove 160 is disposed on the fifth surface of the bottom wall 140 of the case body, the length and width of the explosion-proof groove 160 may be defined to 0.2 times to 0.8 times the diameter of the bottom wall 140. If the explosion-proof groove 160 is too short, it will not be able to play the role of stamping, and if the explosion-proof groove 160 is too long, it will affect the overall stability of the battery case, and when the internal gas pressure is too large, it is easy to cause cracking of the battery case, which is counterproductive.

Further, it can be understood that since the inside of the battery case is injected with the electrolyte solution when the battery case is used for battery assembling, the explosion-proof groove 160 may not be a through groove, otherwise it will cause the electrolyte solution to leak, which endangers safety. In this embodiment, the depth of the explosion-proof groove 160 is 0.2 times to 0.8 times the thickness of the bottom wall 140. If the explosion-proof groove 160 is too shallow, it will not be able to play the role of stamping, and if the explosion-proof groove 160 is too deep, it will affect the overall stability of the battery case, and when there is the internal gas pressure, the explosion-proof groove 160 is easy to be broken, which is counterproductive.

Further, when at least one explosion-proof groove 160 is disposed on the sixth surface of the side wall 150 of the case body 10, the at least one explosion-proof groove 160 extends in a thickness direction of the case body 10; the at least one explosion-proof groove 160 has a length of 0.2 times to 0.8 times the thickness of the case body 10, the at least one explosion-proof groove 160 has a width of 0.003 times to 0.2 times the perimeter of the side wall 150, and the at least one explosion-proof groove 160 has a depth of 0.2 times to 0.8 times the thickness of the side wall 150.

In this embodiment, when at least one explosion-proof groove 160 is disposed on the sixth surface of the side wall 150 of the case body 10, the explosion-proof groove 160 extends in the thickness direction of the case body 10, the extension direction of the explosion-proof groove 160 is vertical to the first cover body 110 and the second cover body 130. Based on the same reason with the above embodiment, the definition of the length of the explosion-proof groove 160 to be 0.2 times to 0.8 times the thickness of the case body 10, the width of the explosion-proof groove 160 to be 0.003 times to 0.2 times the perimeter of the side wall 150, and the depth of the explosion-proof groove 160 to be 0.2 times to 0.8 times the thickness of the side wall 150 makes the explosion-proof groove 160 play the role of stamping, and ensures the overall stability of the battery case, which is not described repeatedly herein to avoid repetition.

Further, when at least one explosion-proof groove 160 is disposed on the fourth surface of the second cover body 130, the at least one explosion-proof groove 160 has a length of 0.2 times to 0.8 times the diameter of the second cover body 130, the at least one explosion-proof groove 160 has a width of 0.2 times to 0.8 times the diameter of the second cover body 130, the at least one explosion-proof groove 160 has a depth of 0.2 times to 0.8 times the thickness of the second cover body 130.

In this embodiment, when at least one explosion-proof groove 160 is disposed on the fourth surface of the second cover body 130, i.e., the surface of the second cover body 130 facing outwards, and based on the same reason with the above embodiment, the definition of the length of the explosion-proof groove 160 to be 0.2 times to 0.8 times the diameter of the second cover body 130, the width of the explosion-proof groove 160 to be 0.2 times to 0.8 times the diameter of the second cover body 130, and the depth of the explosion-proof groove 160 to be 0.2 times to 0.8 times the thickness of the second cover body 130 makes the explosion-proof groove 160 play the role of stamping, and ensures the overall stability of the battery case, which is not described repeatedly herein to avoid repetition.

Optionally, the case body 10 is welded or soldered with the first cover body 110.

In this embodiment, the case body 10 and the first cover body 110 may be laser-welded, may also be electrically welded, and may further be thermal-sealingly soldered, which is not limited herein. When the battery case is used for battery assembling, the welding or soldering between the case body 10 and the first cover body 110 can further improve the sealing property of the battery case, prevent the electrolyte solution from leaking, and further improve the performance of the battery.

Optionally, the first cover body 110 is welded, soldered, or injection molded with the first insulating part 120; the second cover body 130 is welded, soldered, or injection molded with the first insulating part 120.

In this embodiment, the first cover body 110 and the first insulating part 120 may be laser-welded, may also be electrically welded, and may further be thermal-sealingly soldered, or connected by injection-molding. Similarly, the second cover body 130 and the first insulating part 120 may be laser-welded, may also be electrically welded, and may further be thermal-sealingly soldered, or connected by injection-molding, which is not limited herein. As such, when the battery case is used for battery assembling, the sealing property of the battery case can be further improved, the electrolyte solution can be prevented from leaking, and battery performance can be further improved.

In summary, the battery case provided by this embodiment includes: the case body 10, the first cover body 110, the first insulating part 120, and the second cover body 130, where the case body 10 includes the bottom wall 140 and the side wall 150 connected to the bottom wall 140, and the bottom wall 140 is a conical surface or a spherical surface; the first cover body 110 includes the first surface and the second surface disposed opposite to each other; the second cover body 130 includes the third surface and the fourth surface disposed opposite to each other; the first surface of the first cover body 110 is connected to one end of the side wall 150 away from the bottom wall 140, and the second surface of the first cover body 110 is connected to the third surface of the second cover body 130 by the first insulating part 120; the first cover body 110 is provided with the first through hole, and the first insulating part 120 is provided with the second through hole corresponding to the first through hole.

Since the case body 10 and a cover body composed of the first cover body 110, the first insulating part 120, and the second cover body 130 may be connected together by the method of welding, soldering, etc., it has good sealing property. Therefore, the structure that the first insulating part 120 is connected to the second cover body 130 by the first cover body 110 improves the sealing property of the battery case. When used for battery assembling, the battery case can improve the sealing property of the battery, and improve battery performance.

Figure 5:
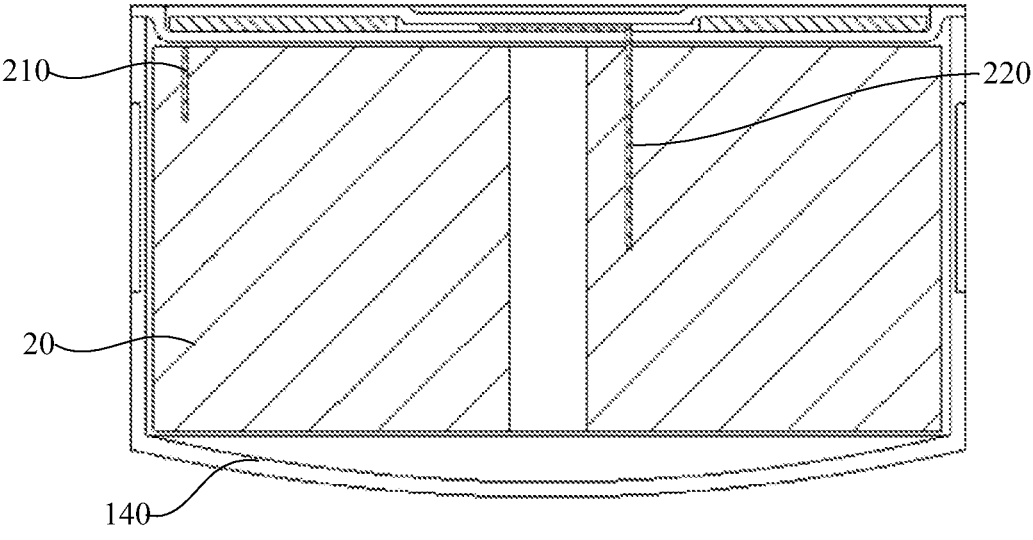
FIG. 5 is a cross-sectional view of a battery provided by the embodiment 1 of the present application.

As shown in FIG. 5, this embodiment further provides a battery, the battery includes the battery case provided by the embodiment shown in FIGS. 1 to 4, and the battery cell 20 accommodated in the battery case, where a first tab 210 of the battery cell 20 is connected to the first cover body 110, and a second tab 220 of the battery cell 20 is connected to the second cover body 130.

In this embodiment, when the first tab 210 of the battery cell 20 is a positive electrode tab, the second tab 220 of the battery cell 20 is a negative electrode tab, and when the first tab 210 of the battery cell 20 is a negative electrode tab, the second tab 220 of the battery cell 20 is a positive electrode tab. Herein, it is described in the situation that the first tab 210 of the battery cell 20 is a positive electrode tab, and the second tab 220 of the battery cell 20 is a negative electrode tab.

In this embodiment, when the battery case provided by the above embodiment is used in battery package, the structure that the case body 10, the first cover body 110, the first insulating part 120, and the second cover body 130 are connected in sequence can improve the overall sealing property of the battery. Also, the first tab 210 drawn from a positive electrode sheet of the battery cell 20 may be connected to the first cover body 110, and the second tab 220 drawn from a negative electrode sheet of the battery cell 20 may be connected to the second cover body 130. Since the first cover body 110 and the second cover body 130 are separated by the first insulating part 120 therebetween, the positive electrode tab and the negative electrode tab of the battery cell 20 are insulated without the occurrence of short circuit, ensuring the normal operation of the battery.

Embodiment 2

Figure 6:
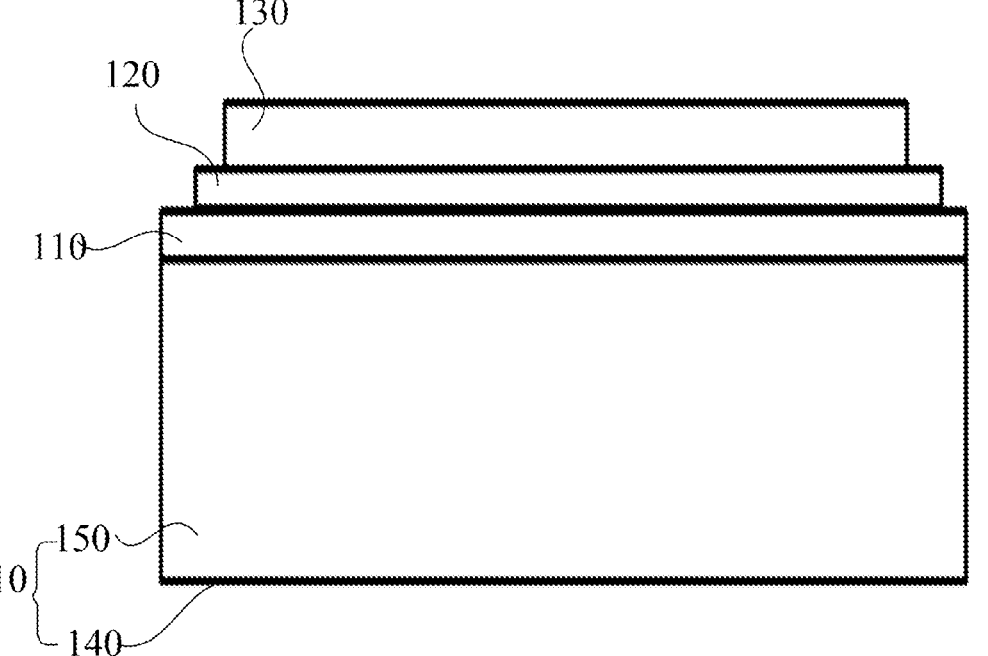
FIG. 6 is a front view of a battery case provided by an embodiment 2 of the present application.
Figure 7:
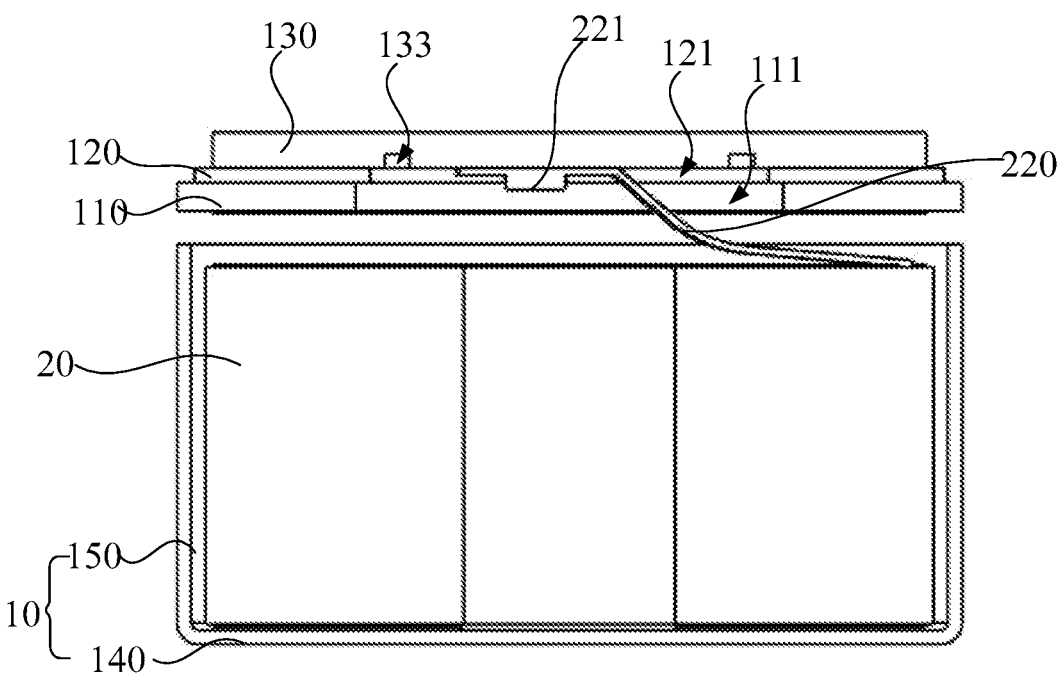
FIG. 7 is a cross-sectional view of the battery case provided by the embodiment 2 of the present application after being assembled into a battery.

As shown in FIGS. 6 and 7, the embodiment 2 of the present application provides a battery case for wrapping the outside of a battery cell 20, including a case body 10, and the battery cell 20 of a battery may be placed in the case body 10. Where, the case body 10 includes a bottom wall 140 and an annular side wall 150, and a bottom end of the side wall 150 is connected to the bottom wall 140; a top end of the side wall 150 has an opening.

Specifically, the bottom end of the side wall 150 and the bottom wall 140 may be connected together by welding, soldering, bonding, or integral molding, etc., which is not limited herein.

The battery cell 20 includes a first tab (not illustrated) and a second tab 220, where the first tab may be a positive tab, and the second tab 220 may be a negative tab; or the first tab may be a negative tab, the second tab 220 may be a positive tab.

In this embodiment, a first cover body 110, a first insulating part 120, and a second cover body 130 are further included. Where, the first cover body 110, the first insulating part 120, and the second cover body 130 together form a case cover, an end surface of one side of the case cover is connected to an end surface of the opening of the case body 10, an end surface of a bottom end of the first cover body 110 is connected to an end surface of the opening of the case body 10. The battery cell 20 may be sealed into an accommodating cavity composed of the case cover and the case body 10.

Specifically, the second cover body 130 may be electrically connected to the second tab 220. The first cover body 110 may be electrically connected to the first tab (not illustrated); or the first cover body 110 may be electrically connected to the first tab by the case body 10. Exemplarily, the first tab may be connected to an inner wall of the bottom wall 140.

Where, the first cover body 110 may be a metal ring, the first insulating part 120 may be an insulating ring, and the second cover body 130 may be a metal sheet.

Further, the case body 10 and the case cover may be connected together by welding, soldering, or bonding, etc., which is not limited herein.

Figure 8:
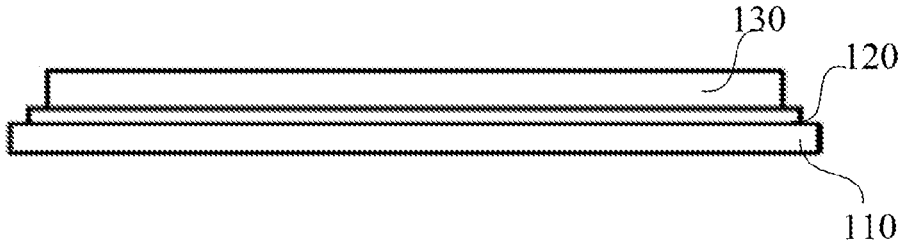
FIG. 8 is a front view of a case cover in the battery case provided by the embodiment 2 of the present application.
Figure 9:
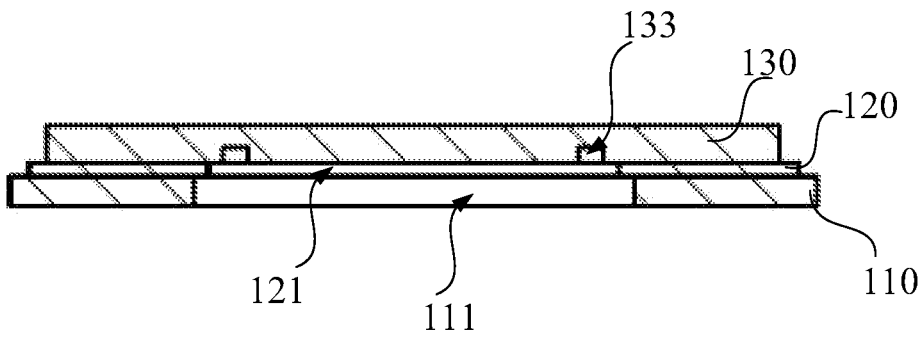
FIG. 9 is a cross-sectional view of the case cover in the battery case provided by the embodiment 2 of the present application.
Figure 10:
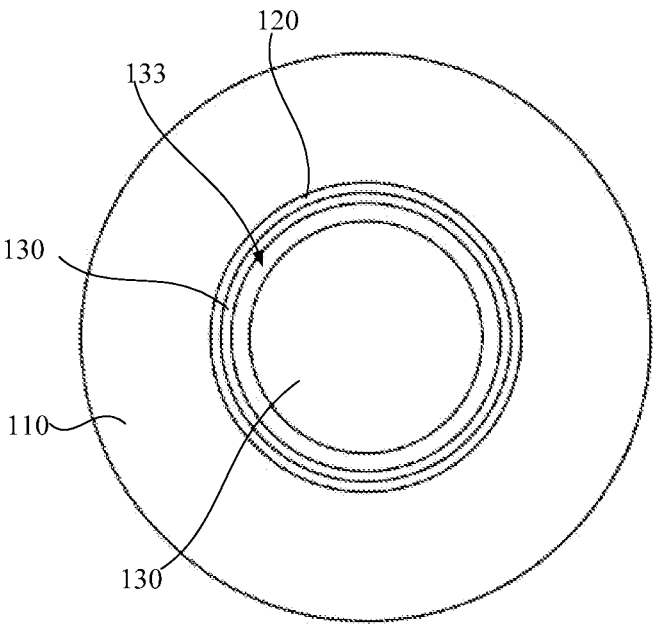
FIG. 10 is a bottom view of the case cover in the battery case provided by the embodiment 2 of the present application.

Continuing to refer to FIGS. 8-10, the first insulating part 120 is located at one side of the first cover body 110 facing away from the bottom wall 140 of the case body 10, and the second cover body 130 is located at one side of the first insulating part 120 facing away from the first cover body 110. That is, the first insulating part 120 is located between the first cover body 110 and the second cover body 130.

Where, a central hole enclosed by an inner edge of the first insulating part 120 is a second through hole 121, and the first insulating part 120 may avoid short-circuit caused by the contact between first cover body 110 and the second cover body 130. Meanwhile, the first cover body 110 and the second cover body 130 are sealingly connected together by the first insulating part 120.

Further, the first insulating part 120 may be a sealing ring made of polypropylene material, or a rubber ring, or may be an insulating rubber ring or a connecting part made of other insulating materials, which is not limited herein.

Figure 11:
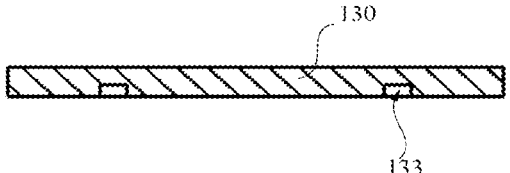
FIG. 11 is a cross-sectional view of a second cover body in the battery case provided by the embodiment 2 of the present application.
Figure 12:
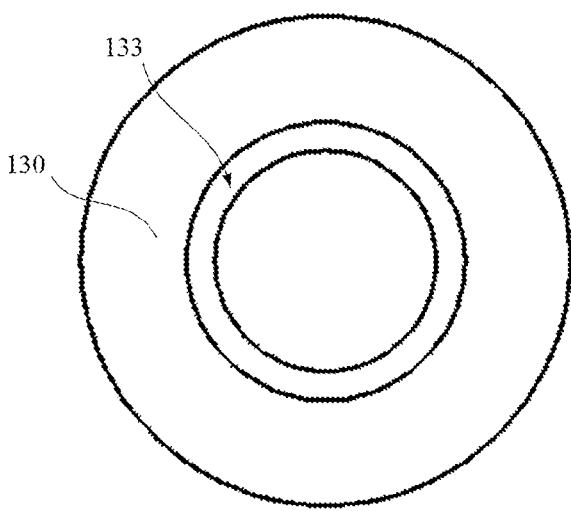
FIG. 12 is a bottom view of the second cover body in the battery case provided by the embodiment 2 of the present application.

Continuing to refer to FIGS. 11 and 12, an annular groove 133 is annularly disposed on an end surface of one side of the second cover body 130 facing the first cover body 110, and the annular groove 133 is located at an area that the second through hole 121 faces. Alternatively, a convex rib is annularly disposed on the end surface of the one side of the second cover body 130 facing the first cover body 110, that is, the annular groove 133 may be replaced with the convex rib. The convex rib is located at the area that the second through hole 121 faces. When the second cover body 130 is observed from the central hole enclosed by the inner edge of the first insulating part 120, a relative position between the second cover body 130 and the first insulating part 120 may be known by a relative position between the annular groove 133 or the convex rib and the inner edge of the first insulating part 120, so that the second cover body 130 may be positioned, and whether the first insulating part 120 and the second cover body 130 are aligned or not may be judged.

It should be noted that during the actual production process, an outer edge of the annular groove 133 or the convex rib may be disposed close to the inner edge of the first insulating part 120. At this time, as long as the annular groove 133 or the convex rib could be observed through a detection device, it may be considered that the first insulating part 120 and the second cover body 130 are aligned. It can be seen that the alignment between the first insulating part 120 and the second cover body 130 is allowed to have a certain process error.

In this embodiment, the inner edge of the first insulating part 120 is covered with an annular adhesive dispense layer, and the inner edge of the first insulating part 120 is sealed with the second cover body 130 and first cover body 110 by the adhesive dispense layer. That is, the inner edge of the first insulating part 120 is sealed between the inner edges of the second cover body 130 and the first cover body 110 by the adhesive dispense layer. Meanwhile, the adhesive dispense layer may also avoid corrosion caused by the contact between the first insulating part 120 and the electrolyte solution inside the battery.

The adhesive dispense layer may be formed by dispensing adhesive, and dispensing adhesive is performed at the inner edge of the first insulating part 120. Since the adhesive is fluid, the adhesive is easy to flow from a dispensing position to a center of the second cover body 130 when dispensing adhesive. However, the annular groove 133 is located at an area between the inner edge of the first insulating part 120 and the center of the second cover body 130. Therefore, when the adhesive flows to the center direction of the second cover body 130, the adhesive will enter the annular groove 133. The annular groove 133 has the capability of accommodating the adhesive, which may prevent the adhesive from continuing to flow to the center of the second cover body 130. The adhesive cannot flow to an area between the annular groove 133 and the center of the second cover body 130, and the area may be normally electrically connected to the tab.

Alternatively, the convex rib is located at the area between the inner edge of the first insulating part 120 and the center of the second cover body 130. Therefore, when the adhesive flows to the center direction of the second cover body 130, the adhesive will be blocked by the convex rib, thereby preventing the adhesive from continuing to flow to the center of the second cover body 130. The adhesive cannot flow to the area between the convex rib and the center of the second cover body 130, and the area may be normally electrically connected to the tab.

Further, the cross-sectional shape of the annular groove 133 or the convex rib may be a shape of rectangle, arc, triangle, semi-circle, etc., which is not limited herein.

Further, the annular groove 133 or the convex rib may be a circle ring, that is, the shape enclosed by the annular groove 133 or the convex rib may be circular. Of course, the shape enclosed by the annular groove 133 or the convex rib may also be a shape of rectangle, triangle, polygon, star, etc., which is not limited herein. The second cover body 130 may be visually positioned by observing the positions of the annular groove 133 or the convex rib and the other components.

The battery case provided by this embodiment includes the case body 10, the first cover body 110, the first insulating part 120, and the second cover body 130. An end surface of one side of the case body 10 is provided with an opening, an end surface of one side of the first cover body 110 is connected to an end surface of the opening of the case body 10, the first insulating part 120 is located at one side of the first cover body 110 facing away from the case body 10, and the second cover body 130 is located at one side of the first insulating part 120 facing away from the first cover body 110; the first cover body 110, the first insulating part 120, and the second cover body 130 together form the case cover, an end surface of one side of the case cover is connected to the end surface of the opening of the case body 10, and the battery cell 20 may be sealed into the accommodating cavity composed of the case cover and the case body 10.

The central hole enclosed by the inner edge of the first insulating part 120 is the second through hole 121, the annular groove 133 or the convex rib is annularly disposed on an end surface of one side of the second cover body 130 facing the first cover body 110, and the annular groove 133 or the convex rib is located at the area that the second through hole 121 faces. When the second cover body 130 is observed from the central hole enclosed by the inner edge of the first insulating part 120, a relative position between the second cover body 130 and the first insulating part 120 may be known by a relative position between the annular groove 133 or the convex rib and the inner edge of the first insulating part 120, so that the second cover body 130 may be positioned, and it may be judged whether the first insulating part 120 and the second cover body 130 are aligned. Therefore, the battery case provided by this embodiment solves the technical problem that when the second cover body 130 is observed from the central hole enclosed by the inner edge of the first insulating part 120, the surface of the second cover body 130 facing the central hole enclosed by the inner edge of the first insulating part 120 is flat and smooth, with almost no difference, so the relative position between the second cover body 130 and the first insulating part 120 cannot be judged, so that it is impossible to judge whether the first insulating part 120 and the second cover body 130 are aligned.

In this embodiment, a central hole enclosed by the inner edge of the first cover body 110 is the first through hole 111, and the second through hole 121 at least partially overlaps with the first through hole 111. Where the second tab 220 may protrude from a portion where the second through hole 121 and the first through hole 111 overlap from the case body 10, to be connected to the second cover body 130. That is, the second tab 220 may protrude in sequence from the first through hole 111 and the second through hole 121, to be electrically connected to one side of the second cover body 130 facing the case body 10.

Where, the relative position relationship between the shapes of areas enclosed by the first through hole 111 and the annular groove 133 may be used as a quality detection parameter about whether the case cover is aligned after it is completed.

The second through hole 121 and the first through hole 111 may be in the shape of rectangle, circle, or other shapes, which is not limited herein.

In order to improve the tightness and sealing property of the connection of the first insulating part 120 to the first cover body 110 and the second cover body 130, heating and pressuring may be performed to the first cover body 110 and the second cover body 130. As such, at high temperature and high pressure, the first insulating part 120 sandwiched between the first cover body 110 and the second cover body 130 can generate an overflowing adhesive that partially overflows from a connecting position between the first cover body 110 and the second cover body 130. Part of the overflowing adhesive overflows from the inner edge of the first insulating part 120 to the connecting position between the first insulating part 120, the inner edge of the first cover body 110, and the second cover body 130. As such, the overflowing adhesive can further sealingly bond the first cover body 110 and the second cover body 130, which improves the reliability of the connection and sealing of the first cover body 110 and the second cover body 130 by the first insulating part 120.

Since the annular groove 133 or the convex rib is disposed at the area between the inner edge of the first insulating part 120 and the center of the second cover body 130, the annular groove 133 or the convex rib may prevent the overflowing adhesive from continuing to flow to the center direction of the second cover body 130, which avoids the affect of the overflowing adhesive on the connection between the second cover body 130 and the tab.

Figure 13:
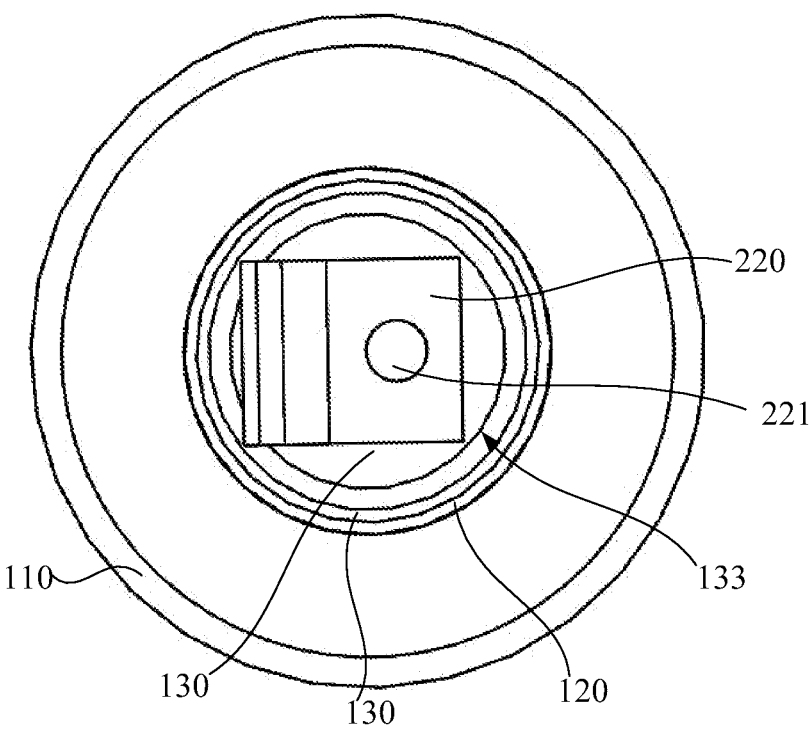
FIG. 13 is a bottom view of the connection between the case cover and a second tab in the battery case provided by the embodiment 2 of the present application.

Continuing to refer to FIGS. 7 and 13, in this embodiment, it further includes a second welding point 221, the second cover body 130 is used to weld with the second tab 220 of the battery cell 20 to form the second welding point 221, and the second welding point 221 faces the area enclosed by the inner edge of the annular groove 133 or the convex rib. Since the formed second welding point 221 is located in the area enclosed by the inner edge of the annular groove 133 or the convex rib, it avoids the affect of the dispensing adhesive and the overflowing adhesive on the connection between the second welding point 221 and the second tab 220. Where, the second welding point 221 and the second tab 220 may be connected by laser-welding.

In this embodiment, the projection of the inner edge of the first cover body 110 on the bottom wall 140 is located within the projection of the first insulating part 120 on the bottom wall 140. As disposed like this, the inner edge of the first insulating part 120 exceeds the inner edge of the first cover body 110, which may prevent the inner edge of the first cover body 110 from contacting with the second cover body 130, and function the effect of insulating protection.

In this embodiment, an outer diameter of the first insulating part 120 is greater than or equal to an outer diameter of the first cover body 110. An outer edge of the first insulating part 120 exceeds an outer edge of the first cover body 110, which may prevent the outer edge of the first cover body 110 from contacting the outer edge of the second cover body 130, and function the effect of insulating protection.

Optionally, the outer diameter of the first insulating part 120 is greater than or equal to an outer diameter of the second cover body 130. The outer edge of the first insulating part 120 exceeds the outer edge of the second cover body 130, which may prevent the outer edge of the second cover body 130 from contacting the outer edge of the first cover body 110, and function the effect of insulating protection.

Optionally, the outer diameter of the first insulating part 120 is greater than or equal to the outer diameter of the first cover body 110 and the outer diameter of the second cover body 130 simultaneously. The outer edge of the first insulating part 120 exceeds the outer edges of the first cover body 110 and the second cover body 130, which may prevent the outer edge of the second cover body 130 from contacting the outer edge of the first cover body 110, and function the effect of insulating protection.

In this embodiment, a distance between the annular groove 133 or the convex rib and the center of the second cover body 130 is greater than or equal to 2 mm and less than or equal to 14 mm. That is to say, the distance between a wall surface of one side of the annular groove 133 or the convex rib close to the center of the second cover body 130 and the center of the second cover body 130 is greater than or equal to 2 mm and less than or equal to 14 mm. As such, the appearance size of the button type battery is satisfied.

The annular groove 133 or the convex rib has a width greater than or equal to 0.05 mm and less than or equal to 2 mm; a depth of the annular groove 133 or a height of the convex rib is greater than or equal to 0.02 mm and less than or equal to 0.4 mm. As such, it is easy to visually positioning, with the ability to accommodate adhesive, meanwhile the appearance size of the button type battery is also satisfied.

In this embodiment, the first cover body 110 has an outer diameter greater than or equal to 8 mm and less than or equal to 16 mm; a distance between the inner edge of the first cover body 110 and a center of the first cover body 110 is greater than or equal to 3 mm and less than or equal to 14 mm; the first cover body 110 has a thickness greater than or equal to 0.05 mm and less than or equal to 0.5 mm. As such, the appearance size of the button type battery is satisfied.

In this embodiment, the first insulating part 120 has an outer diameter greater than or equal to 8 mm and less than or equal to 16 mm; a distance between the inner edge of the first insulating part 120 and a center of the first insulating part 120 is greater than or equal to 2 mm and less than or equal to 14 mm; the first insulating part 120 has a thickness greater than or equal to 0.05 mm and less than or equal to 0.5 mm. As such, it functions the effect of insulating and sealing, meanwhile the appearance size of the button type battery is satisfied.

In this embodiment, the second cover body 130 has a diameter greater than or equal to 6 mm and less than or equal to 16 mm; the second cover body 130 has a thickness greater than or equal to 0.05 mm and less than or equal to 0.5 mm. As such, the appearance size of the button type battery is satisfied.

In the battery case provided in this embodiment, the first cover body 110, the first insulating part 120, and the second cover body 130 are attached in sequence to form the case cover, and the case cover is subjected to heating and pressuring for sealing, and dispensing adhesive for sealing. Since the case body 10 and the case cover composed of the first cover body 110, the first insulating part 120, and the second cover body 130 may be connected together by welding, soldering, etc., it has good sealing property. Therefore, the structure that the first cover body 110 is connected to the second cover body 130 by the first insulating part 120 improves the sealing property of the battery case. When used for battery assembling, the battery case can improve the sealing property of the battery, and improve battery performance.

The adhesive may flow into the annular groove 133 from a sealing position, and the annular groove 133 prevents the adhesive from continuing to flow to the center of the second cover body 130; or the adhesive is blocked by the convex rib when it flows to the center direction of the second cover body 130, thereby avoiding the affect of the adhesive on the connection between the second tab 220 and the second cover body 130. The end surface of one side of the case cover is connected to the end surface of the opening of the case body 10, and the battery cell 20 may be sealed into the accommodating cavity composed of the case cover and the case body 10.

In addition, this embodiment further provides a battery, at least including the battery cell 20 and the battery case of the above embodiment, and the battery case wraps the outside of the battery cell 20.

The battery cell 20 may be a winding-type battery cell, specifically, the winding-type battery cell includes a first electrode sheet, a second electrode sheet, and a separation film separating the first electrode sheet from the second electrode sheet; the first tab (not illustrated) is disposed on the first electrode sheet, the first tab may be disposed on the first electrode sheet by welding, and the second tab 220 is disposed on the second electrode sheet, the second tab 220 may be disposed on the second electrode sheet by welding; during the winding process, the first electrode sheet, the second electrode sheet, and the separation film are wound layer-by-layer in the same direction starting from a winding head end, and finally the winding-type battery cell is formed.

When the first electrode sheet is a positive electrode sheet and the second electrode sheet is a negative electrode sheet, the first tab is a positive tab and the second tab 220 is a negative tab; or when the first electrode sheet is a negative electrode sheet and the second electrode sheet is a positive electrode sheet, the first tab is a negative tab and the second tab 220 is a positive tab.

Where, the structure and working principle of the battery have been described in detail in the above embodiment, which will not be repeatedly described herein.

In the battery case provided in this embodiment, the first cover body 110, the first insulating part 120, and the second cover body 130 are attached in sequence to form the case cover, and the case cover is subjected to heating and pressuring for sealing, and dispensing adhesive for sealing. The adhesive may flow into the annular groove 133 from a sealing position, and the annular groove 133 prevents the adhesive from continuing to flow to the center of the second cover body 130; or the adhesive is blocked by the convex rib when it flows to the center direction of the second cover body 130, thereby avoiding the affect of the adhesive on the connection between the second tab 220 and the second cover body 130. When the second cover body 130 is observed from the central hole enclosed by the inner edge of the first insulating part 120, a relative position between the second cover body 130 and the first insulating part 120 may be known by a relative position between the annular groove 133 or the convex rib and the inner edge of the first insulating part 120, so that the second cover body 130 may be positioned, and it may be judged whether the first insulating part 120 and the second cover body 130 are aligned. The end surface of one side of the case cover is connected to the end surface of the opening of the case body 10, and the winding-type battery cell may be sealed into the accommodating cavity composed of the case cover and the case body 10. The bottom wall 140 of the case body 10 is electrically connected to the first tab, and the second cover body 130 is electrically connected to the second tab 220, so as to form positive and negative electrodes of the battery respectively. Since the case body 10 and a case cover composed of the first cover body 110, the first insulating part 120, and the second cover body 130 may be connected together by welding, soldering, etc., it has good sealing property. Therefore, the structure that the first cover body 110 is connected to the second cover body 130 by the first insulating part 120 improves the sealing property of the battery case. When used for battery assembling, the battery case can improve the sealing property of the battery, and improve the performance of the battery.

When this button type battery is used in an electronic device, one side of the case body 10 facing away from the first cover body 110 is connected and conducted to a positive electrode or a negative electrode of the electronic device, and the second cover body 130 is connected and conducted to the negative electrode or the positive electrode of the electronic device, so that the battery can supply power to the electronic device.

Embodiment 3

Figure 14:
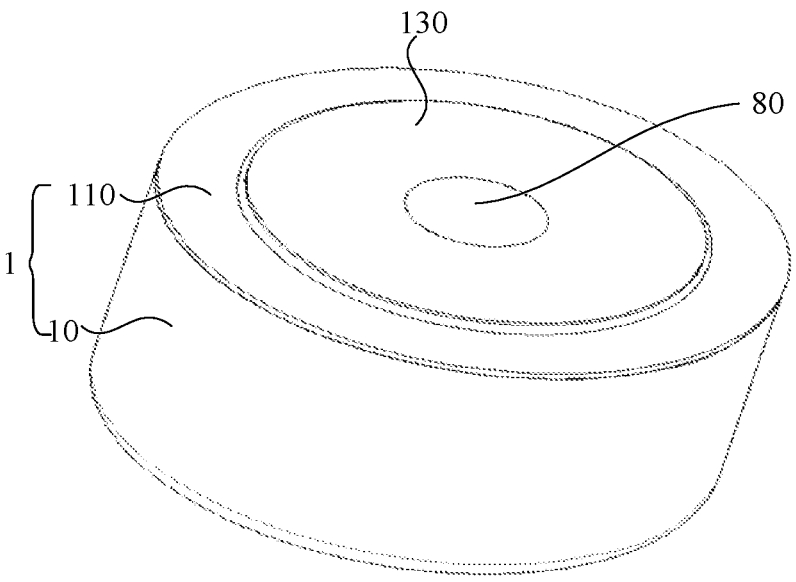
FIG. 14 is a structure schematic view of a battery provided by an embodiment 3 of the present application.
Figure 15:
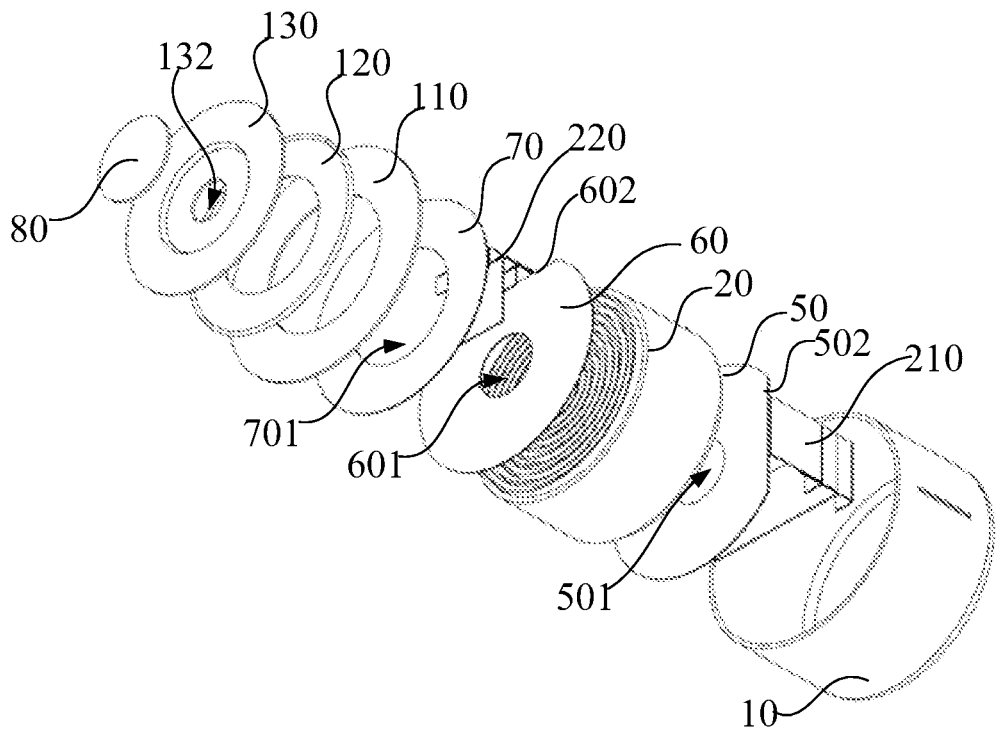
FIG. 15 is a exploded schematic structural diagram of the battery provided by the embodiment 3 of the present application.

As shown in FIGS. 14 and 15, a battery provided by the embodiment 3 of the present application includes: an encapsulating case 1, a battery cell 20, and a second cover body 130; an accommodating cavity for accommodating the battery cell 20 is disposed in the encapsulating case 1, the encapsulating case 1 is provided with a hole communicating with the accommodating cavity, the second cover body 130 covers on the hole, and a first insulating part 120 is disposed between the second cover body 130 and the encapsulating case 1, the second cover body 130 and the encapsulating case are in insulating and sealing connection together by the first insulating part 120, to achieve the objective of insulating and sealing between the second cover body 130 and the encapsulating case 1. Where, the first insulating part 120 may be an insulating part made of polypropylene material.

Where, the second cover body 130 may be a conductive part, and the first insulating part 120 may be a sealing rubber ring.

Figure 16:
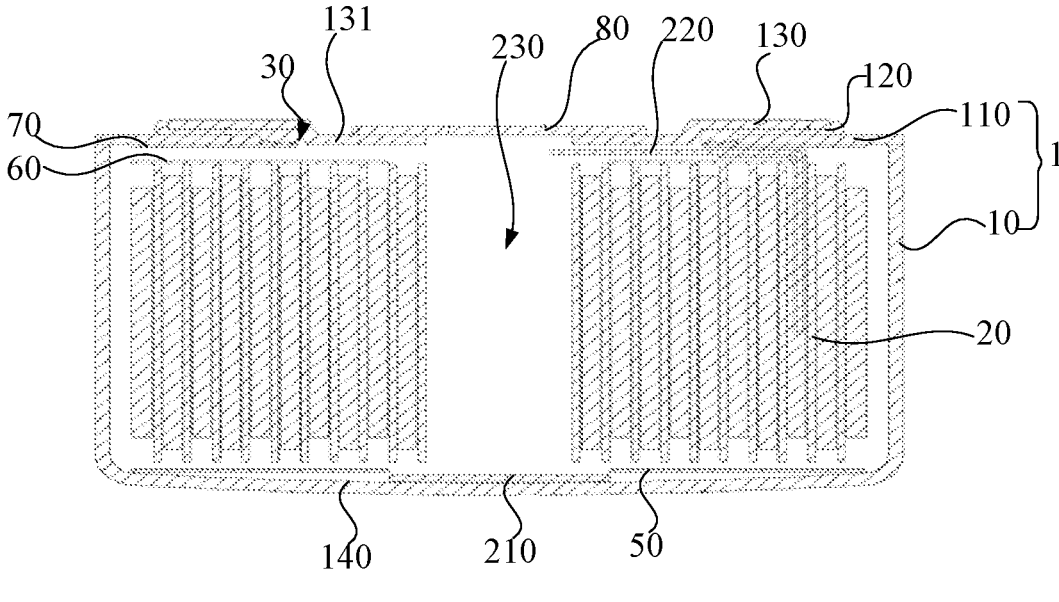
FIG. 16 is an internal schematic structural diagram of the battery provided by the embodiment 3 of the present application.
Figure 17:
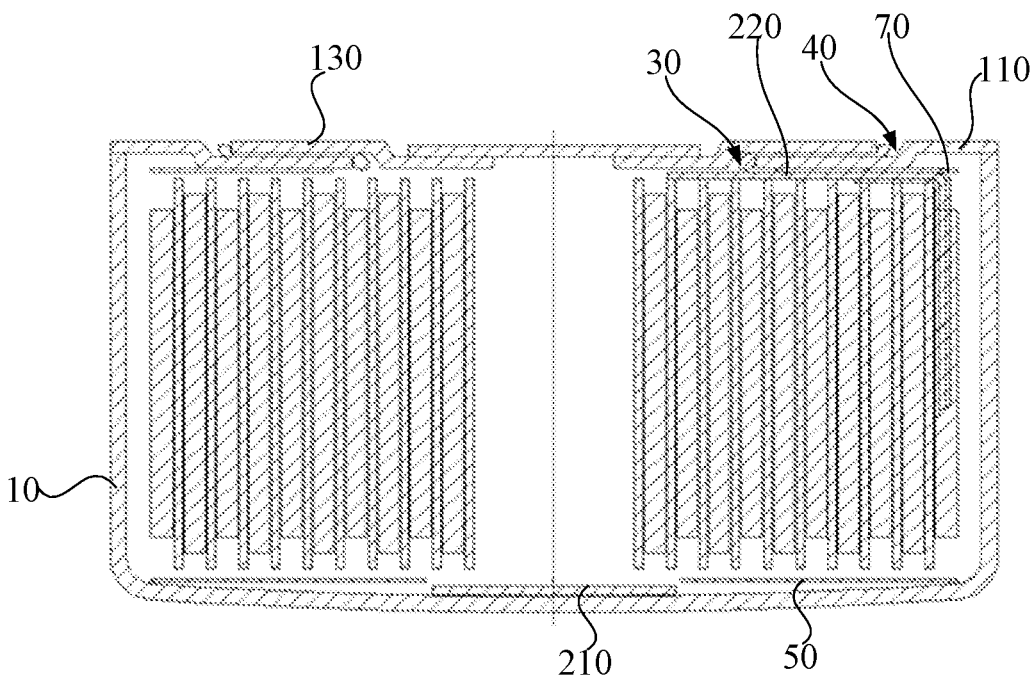
FIG. 17 is another internal schematic structural diagram of the battery provided by the embodiment 3 of the present application.

Optionally, as shown in FIGS. 16 and 17, the encapsulating case 1 includes a case body 10 and a first cover body 110, the case body 10 is provided with a concave groove extending toward a bottom wall 140 of the case body 10, and the concave groove forms the accommodating cavity for accommodating the battery cell 20, the first cover body 110 covers on the accommodating cavity, so that the case body 10 and the first cover body 110 enclose to form the encapsulating case 1 having the closed accommodating cavity. Where, in order to improve the sealing property of the encapsulating case 1, the first cover body 110 is in sealing connection with the case body 10, for example, the first cover body 110 is connected to the case body 10 by welding, bonding, etc.

Further, the hole communicating with the accommodating cavity is disposed in the first cover body 110, the second cover body 130 covers on the hole, the second cover body 130 and the first cover body 110 are in insulating and sealing connection by the first insulating part 120. An edge of the hole is enclosed to form a first through hole.

Where, the first insulating part 120 may be annular, in order to improve the connecting tightness for the first insulating part 120 to be connected between the second cover body 130 and the first cover body 110, heating and pressuring may be performed to the second cover body 130 and the first cover body 110. As such, at high temperature and high pressure, the first insulating part 120 sandwiched between the second cover body 130 and the first cover body 110 can generate an overflowing adhesive that partially overflows from a connecting position between the second cover body 130 and the first cover body 110. Part of the overflowing adhesive overflows from an outer edge of the first insulating part 120 to a connecting position between the second cover body 130 and first cover body 110, and another part of the overflowing adhesive overflows from an inner edge of the first insulating part 120 to a connecting position between the first insulating part 120 and an edge of the hole of the first cover body 110. As such, the overflowing adhesive can further sealingly bond the second cover body 130 and the first cover body 110, which improves the reliability of the connection of the second cover body 130 and the first cover body 110 by the first insulating part 120.

Further, as shown in FIG. 16, the second cover body 130 is provided with a protruding portion 131 protruding toward the accommodating cavity, an annular first adhesive-overflowing groove 30 is formed between the protruding portion 131 and the edge of the hole. As such, the adhesive overflowing from the inner edge of the first insulating part 120 may be located in the first adhesive-overflowing groove 30, and the overflowing adhesive may further improve the sealing property between the second cover body 130 and the first cover body 110. Where, the first adhesive-overflowing groove 30 has a width of 0.1-3 mm in the radial direction of the battery cell 20, therefore, it can accommodate the overflowing adhesive, meanwhile the appearance size of the battery is also satisfied.

Optionally, as shown in FIG. 4, the first cover body 110 is further provided with an accommodating groove, the second cover body 130 is located in the accommodating groove, and a second adhesive-overflowing groove 40 is formed between an outer edge of the second cover body 130 and a side groove wall of the accommodating groove. The adhesive overflowing from the outer edge of the first insulating part 120 may be located in the second adhesive-overflowing groove 40, the adhesive in the second adhesive-overflowing groove 40 may further improve the sealing property between the second cover body 130 and the first cover body 110, thereby improving the overall sealing property of the battery. And that the overflowing adhesive is located in the second adhesive-overflowing groove 40 may improve the surface flatness and overall aesthetics of the battery. Also, the width of the second adhesive-overflowing groove 40 in the radial direction of the battery cell 20 is set to be 0.1-3 mm, therefore, it can ensure accommodating of the overflowing adhesive, meanwhile the appearance size of the battery is also satisfied.

Further, in order to prevent liquids such as water from entering the hollow cavity of the battery from the second adhesive-overflowing groove 40, a sealing adhesive is further disposed in the second adhesive-overflowing groove 40, and a gap between the second cover body 130 and the encapsulating case 1 is sealed by the sealing adhesive, to improve the sealing property of the battery. Where, the sealing adhesive may be an adhesive formed by mixing one of an acrylic resin, an epoxy resin, and polyurethane with a hardener, or may be a sealing adhesive formed by other sealing materials, which is not limited by this embodiment.

In an optional embodiment, the battery cell 20 is a winding type battery cell, specifically, the winding type battery cell includes a first electrode sheet, a second electrode sheet, and a separation film separating the first electrode sheet from the second electrode sheet; a first tab 210 is disposed on the first electrode sheet, the first tab 210 may be disposed on the first electrode sheet by welding, and a second tab 220 is disposed on the second electrode sheet, the second tab 220 may be disposed on the second electrode sheet by welding; during the winding process, the first electrode sheet, the second electrode sheet, and the separation film are wound layer by layer in the same direction starting from a winding head end, and finally the winding type battery cell is formed, meanwhile a hollow cavity 230 coaxial with the battery cell 20 is formed at an axis center position of the battery cell 20.

The first electrode sheet of the battery cell 20 may be a positive electrode sheet, and the second electrode sheet may be a negative electrode sheet. At this time, the first tab 210 disposed on the first electrode sheet is a positive tab, and the second tab 220 disposed on the second electrode sheet is a negative tab. Specifically, the battery cell 20 is accommodated in the accommodating cavity, the positive tab and an inner wall of the bottom wall 140 of the case body 10 are electrically connected by welding to make the case body 10 form the positive electrode of the battery, and the negative tab and the second cover body 130 are electrically connected to make the second cover body 130 form the negative electrode of the battery. When this battery is used in an electronic device, the case body 10 is connected and conducted to the positive electrode of the electronic device, and the second cover body 130 is connected and conducted to the negative electrode of the electronic device, so that the battery cell 20 can supply power to the electronic device.

Alternatively, the first electrode sheet of the battery cell 20 may be a negative electrode sheet, and the second electrode sheet of the battery cell 20 may be a positive electrode sheet. At this time, the first tab 210 disposed on the first electrode sheet is a negative tab, and the second tab 220 disposed on the second electrode sheet is a positive tab. Specifically, the battery cell 20 is accommodated in the accommodating cavity, the negative tab and the case body 10 are electrically connected by welding to make the case body 10 form the negative electrode of the battery, and the positive tab and the second cover body 130 are electrically connected to make the second cover body 130 form the positive electrode of the battery. When this battery is used in an electronic device, the case body 10 is connected and conducted to the negative electrode of the electronic device, and the second cover body 130 is connected and conducted to the positive electrode of the electronic device, so that the battery cell 20 can supply power to the electronic device.

In the process of assembling the battery, at first the battery cell 20 is placed in the accommodating cavity, and then the first tab 210 on the battery cell 20 is electrically connected to the inner wall of the bottom wall 140 of the case body 10 by welding and other methods, but in order to improve the reliability of the electrical connection between the first tab 210 and the inner wall of the bottom wall 140 of the case body 10, usually a columnar thimble is inserted in the hollow cavity 230 of the battery cell 20, and the first tab 210 abuts against the inner wall of the bottom wall 140 of the case body 10 by the thimble, and then the first tab 210 and the inner wall of the bottom wall 140 of the case body 10 are welded.

It should be noted that a recessed welding mark is disposed on a surface of the first tab 210 facing the battery cell 20, and a welding equipment welds the first tab 210 and the case body 10 at the welding mark. For example, resistance soldering or laser soldering may be used. When the resistance soldering is used, the number of the welding marks may be one, and when the laser soldering is used, the number of the welding marks may be four. Where, in order to ensure the reliability of welding, the welding mark may have a depth of 20-200 μm, or a first welding point formed after welding may have a height of 10-120 μm. The first welding point after welding may be formed as one or more individual welding points, or may be a straight line formed by a plurality of welding points, which is not limited in this embodiment.

A first insulating adhesive layer 50 is disposed between a lower end surface of the battery cell 20 and the inner wall of the bottom wall 140 of the case body 10 to prevent electric conduction between the battery cell 20 and the case body 10. A second insulating adhesive layer 60 is disposed between an upper end surface of the battery cell 20 and the first cover body 110 to prevent electric conduction between the battery cell 20 and the first cover body 110. Therefore, in this embodiment, in order to facilitate the insertion of the thimble into the hollow cavity 230 of the battery cell 20 to abut against the first tab 210, and to facilitate the welding of the first tab 210 and the case body 10 by the welding equipment, the first insulating adhesive layer 50 is provided with a third through hole 501 coaxial with the hollow cavity 230. The welding mark on the first tab 210 should be located in an area corresponding to the third through hole 501 and the hollow cavity 230. That is to say, by disposing the third through hole 501 in the first insulating adhesive layer 50, the first insulating adhesive layer 50 will not shield the welding mark on the first tab 210 to facilitate the welding of the first tab 210 and the case body 10 by the welding equipment. There is no need to dispose a welding mark on the outside of the bottom wall 140 of the case body 10, that is, the outside of the bottom wall 140 of the case body 10 is a smooth plane or arc surface, and if the welding mark is disposed on the outside of the bottom wall 140 of the case body 10, some external strong corrosives will corrode the battery through the welding mark on the outside of the bottom wall 140 of the case body 10, resulting in low safety and reliability of the battery. Therefore, in this embodiment, the welding mark is disposed on the surface of the first tab 210 facing the battery cell, to avoid external strong corrosives to corrode the welding mark, thereby improving the safety and reliability of the battery.

Further, the second insulating adhesive layer 60 is provided with a fourth through hole 601 coaxial with the hollow cavity 230. As such, the thimble may abut against the first tab 210 through the third through hole 501, the fourth through hole 601, and the hollow cavity 230. The first tab 210 and the case body 10 are welded by the welding equipment, thereby improving the reliability of the connection between the first tab 210 and the inner wall of the bottom wall 140 of the case body 10, simplifying the difficulty of the battery assembling, and improving the safety and reliability of the battery cell 20.

Further, in order to facilitate the insertion of the thimble into the hollow cavity 230 of the battery cell 20, the aperture of the third through hole 501 may be greater than the diameter of the hollow cavity 230, and the aperture of the fourth through hole 601 may be greater than the diameter of the hollow cavity 230. As such, an edge of the third through hole 501 and an edge of the fourth through hole 601 will not interfere with the insertion of the thimble.

Further, as shown in FIGS. 3 and 4, in this embodiment, in order to ensure the work reliability of the first insulating adhesive layer 50 and the second insulating adhesive layer 60, and for convenience of the insertion of the thimble, the aperture of the third through hole 501 is greater than the diameter of the hollow cavity 230 by 0-0.5 mm, and the aperture of the fourth through hole 601 is greater than the diameter of the hollow cavity 230 by 0-0.5 mm. That is to say, in the ideal state, the third through hole 501 and the fourth through hole 601 have an aperture equal to the diameter of the hollow cavity 230. While when an error is present in manufacturing, in order to avoid the first insulating adhesive layer 50 and the second insulating adhesive layer 60 to interfere with the insertion of the thimble into the hollow cavity 230, the third through hole 501 and the fourth through hole 601 may have an aperture greater than the diameter of the hollow cavity 230, as long as it is ensured that the lower end surface of the battery cell 20 is insulated from the case body 10, and the upper end surface of the battery cell 20 is insulated from the first cover body 110.

Based on the above embodiment, in order to ensure that when the second tab 220 is electrically connected to the second cover body 130, the second tab 220 will not be electrically connected to the first cover body 110, in this embodiment, a third insulating adhesive layer 70 is disposed between the second tab 220 and the first cover body 110. The first cover body 110 is insulated from the second tab 220 by the third insulating adhesive layer 70, to improve the reliability of the electrical connection between the second tab 220 and the second cover body 130.

In an implementable embodiment, the third insulating adhesive layer 70 is a ring surface, and the third insulating adhesive layer 70 is attached to the inner wall of the first cover body 110, and covers a position of the second tab 220 corresponding to the first cover body 110.

Specifically, in order to prevent the third insulating adhesive layer 70 from interfering with the welding or bonding between the first cover body 110 and the case body 10, in the radial direction of the battery cell 20, an outer edge of the third insulating adhesive layer 70 is smaller than an outer edge of the first cover body 110.

Further, the third insulating adhesive layer 70 is further provided with a fifth through hole 701, and the fifth through hole 701 is coaxial with the hollow cavity 230. In order to prevent the first cover body 110 from being electrically connected to the second tab 220, therefore in this embodiment, the aperture of the fifth through hole 701 is smaller than the size of the hole in the first cover body 110 in the radial direction. As such, this may prevent the second tab 220 from being electrically connected to the first cover body 110, while the second tab 220 may partially pass through the fifth through hole 701 to be electrically connected to the second cover body 130.

In an embodiment, in the radial direction of the battery cell 20, the outer edge of the third insulating adhesive layer 70 is smaller than a size of an edge of the first cover body 110 by 0.05-2 mm, and the aperture of the fifth through hole 701 is smaller than the size of the hole in the first cover body 110 in the radial direction by 0-2 mm, thereby improving the reliability of the connection between the second tab 220 and the second cover body 130.

In another implementable embodiment, the third insulating adhesive layer 70 may also be disposed to attach to one side of the second tab 220 close to the first cover body 110, so as to form a protective adhesive of the second tab 220. In the radial direction of the battery cell 20, the distance from the edge of the third insulating adhesive layer 70 on the second tab 220 to the axis center of the battery cell 20 is smaller than the distance from the edge of the hole in the first cover body 110 to the axis center of the battery cell 20. That is to say, the protective adhesive on the second tab 220 extends along the radial direction of the battery cell 20 toward the axis center of the battery cell 20, and the edge of the protective adhesive on the second tab 220 exceeds the edge of the hole in the first cover body 110. As such, this may ensure that the second tab 220 is not electrically connected to the first cover body 110, thereby improving the reliability of the connection between the second tab 220 and the second cover body 130.

Figure 18:
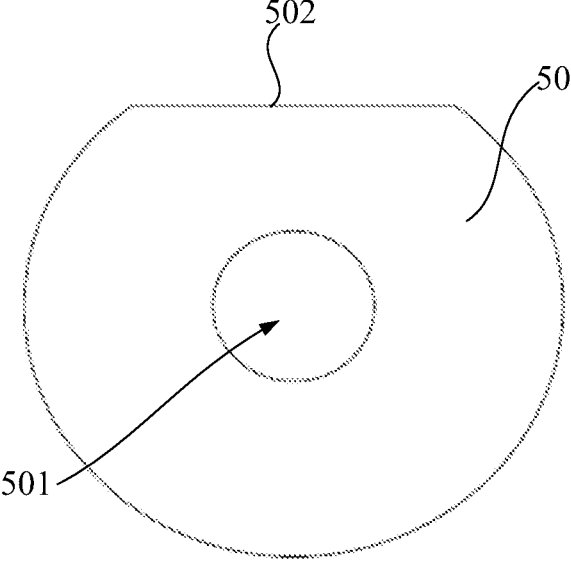
FIG. 18 is a schematic structural diagram of a first insulating adhesive layer in the battery provided by the embodiment 3 of the present application.

Based on the above embodiment, as shown in FIGS. 15 and 18, in order to prevent the first insulating adhesive layer 50 from interfering with the connection between the first tab 210 and the electrode sheet on the battery cell 20, therefore, in this embodiment, the first insulating adhesive layer 50 is subjected to edge-cutting process. As such, part of the edge of the first insulating adhesive layer 50 may be formed into a straight line shaped cutting edge. For convenience to describe, the cutting edge on the first insulating adhesive layer 50 is described by a first cutting edge 502 herein. In the axial direction of the battery cell 20, the first cutting edge 502 is flush with the first tab 210, which may prevent the first insulating adhesive layer 50 from interfering with the connection between the first tab 210 and the electrode sheet on the battery cell 20.

Further, in order to avoid the interference with the connection between the second tab 220 and the electrode sheet on the battery cell 20, the second insulating adhesive layer 60 is also subjected to edge-cutting process. As such, part of the edge of the second insulating adhesive layer 60 may be formed into a straight line shaped cutting edge. For convenience to describe, the cutting edge on the second insulating adhesive layer 60 is described by a second cutting edge 602 herein. In the axial direction of the battery cell 20, the second cutting edge 602 is flush with the second tab 220, which may prevent the second insulating adhesive layer 60 from interfering with the connection between the second tab 220 and the electrode sheet on the battery cell 20, thereby improving the working reliability of the battery.

Optionally, the second cover body 130 is further provided with a liquid injection port 132, and when the battery cell 20 is placed in the accommodating cavity, the first tab 210 on the battery cell 20 is electrically connected to the inner wall of the bottom wall 140 of the case body 10, and the second tab 220 is electrically connected to the second cover body 130, then an electrolyte solution is injected into the accommodating cavity from the liquid injection port 132 in the second cover body 130, and after the electrolyte solution injection is completed, the liquid injection port 132 is covered with a sealing nail 80 and sealed.

Further, in order to improve the surface flatness of the battery, the second cover body 130 may be provided with a groove accommodating the sealing nail 80, and the depth of the groove may be equal to the thickness of the sealing nail 80. As such, when the sealing nail 80 covers on the liquid injection port 132, the sealing nail 80 is flush with the surface of the second cover body 130, thereby improving the surface flatness of the battery.

For the battery provided by the embodiment of the present application, when it is in the specific implementation, first, the first cover body 110 and the second cover body 130 are in insulating and sealing connection through the first insulating part 120 by heating and pressuring, and then the battery cell 20 is placed into the accommodating cavity of the case body 10, and then the first cover body 110 having the second cover body 130 is welded to make the first cover body 110 and the case body 10 to be in sealed connection. The thimble is inserted into the hollow cavity 230 of the battery cell 20, and a first end of the thimble abuts against the first tab 210, a second end of the thimble protrudes out of the first cover body 110 to facilitate the user holding. The first tab 210 is attached to the inner wall of the bottom wall 140 of the case body 10 by the thimble, the first tab 210 and the case body 10 are welded by the welding equipment, and the second tab 220 on the battery cell 20 and the second cover body 130 are electrically connected by welding, etc. The thimble is taken out, and the electrolyte solution is injected into the accommodating cavity from the liquid injection port 132. After the electrolyte solution injection is completed, the liquid injection port 132 is covered with the sealing nail 80, and the sealing nail 80 and the liquid injection port 132 are in sealed connection by bonding or welding, so as to complete the battery assembling.

Also, in the embodiment of the present application, by disposing the third through hole 501 in the first insulating adhesive layer 50, disposing the fourth through hole 601 in the second insulating adhesive layer 60, and disposing the fifth through hole 701 in the third insulating adhesive layer 70, the thimble may pass through the fifth through hole 701, the fourth through hole 601, the hollow cavity 230 in the battery cell 20, and the third through hole 501 in sequence to abut against the first tab 210, which simplifies the difficulty of the battery assembling and improves the working reliability of the battery.

In the battery provided by the embodiment of the present application, since the case body 10 and the case cover composed of the first cover body 110, the first insulating part 120, and the second cover body 130 may be connected together by welding, soldering, etc., it has good sealing property. Therefore, the structure that the first cover body 110 is connected to the second cover body 130 by the first insulating part 120 improves the sealing property of the battery case. When used for battery assembling, the battery case can improve the sealing property of the battery, and improve battery performance. The protruding portion 131 protruding toward the accommodating cavity is disposed on the second cover body 130, the first adhesive-overflowing groove 30 is formed between the protruding portion 131 and the edge of the hole. The adhesive overflowing from the first insulating part 120 is accommodated in the first adhesive-overflowing groove 30. As such, the overflowed adhesive in the first adhesive-overflowing groove 30 may further provide sealing between the second cover body 130 and the encapsulating case 1, thereby improving the sealing property of the battery.

Embodiment 4

The embodiment of the present application further provides an electronic device, including an electronic device body and the battery provided in the embodiment 1, embodiment 2, and embodiment 3, and the battery supplies electrical energy to the electronic device body.

The electronic device body may be a wearable electronic device or other electronic products, or may also be a medical electronic device used in medical treatment, which is not limited by this embodiment.

The structure and working principle of the battery have been described in detail in the embodiment 1, which will not be repeatedly described herein.

The electronic device provided by the embodiment of the present application includes the electronic device body and the battery that supplies electrical energy to the electronic device body, where since the case body 10 and the case cover composed of the first cover body 110, the first insulating part 120, and the second cover body 130 may be connected together by welding, soldering, etc., it has good sealing property. Therefore, the structure that the first cover body 110 is connected to the second cover body 130 by the first insulating part 120 improves the sealing property of the battery case. When used for battery assembling, the battery case can improve the sealing property of the battery, and improve battery performance.

In the several embodiments provided in the present application, it should be understood that the disclosed battery case, battery, and electronic device may be implemented in other methods.

It should be noted here that the numerical values and numerical ranges involved in the embodiments of the present application are approximate values. Affected by manufacturing process, there may be errors in a certain range, which may be considered ignorable by those skilled in the art.

Finally, it should be noted that the foregoing embodiments are merely intended for describing the technical solutions of the present application other than limiting the present application. Although the present application is described in detail with reference to the foregoing embodiments, persons of ordinary skill in the art should understand that they may still make modifications to the technical solutions described in the foregoing embodiments, or make equivalent substitutions to some or all of the technical features thereof. These modifications or substitutions do not make the essence of the corresponding technical solutions depart from the scope of the technical solutions of embodiments of the present application.

What is claimed is:

1. A battery case characterized by comprising a case body, a first cover body, a first insulating part, and a second cover body, wherein the case body comprises a bottom wall and a side wall connected to the bottom wall; the first cover body comprises a first surface and a second surface disposed opposite to each other; the second cover body comprises a third surface and a fourth surface disposed opposite to each other; the first surface of the first cover body is connected to one end of the side wall away from the bottom wall, and the second surface of the first cover body is connected to the third surface of the second cover body by the first insulating part; the first cover body is provided with a first through hole, and the first insulating part is provided with a second through hole corresponding to the first through hole;

an inner edge of the first insulating part is covered with an annular adhesive dispense layer;

an annular groove or a convex rib is annularly disposed on an end surface of one side of the second cover body facing the first cover body, and the annular groove or the convex rib is located between an area where a tab of a battery cell and the second cover body are electrically connected and the adhesive dispense layer.

2. The battery case according to claim 1, wherein the battery case is configured to wrap an outside of the battery cell, the first cover body is a metal ring, the first insulating part is an insulating ring, and the second cover body is a metal sheet; the side wall is an annular side wall, a bottom end of the side wall is connected to the bottom wall, and a top end of the side wall has an opening;

an end surface of a bottom end of the first cover body is connected to an end surface of the opening, an area enclosed by an inner edge of the first cover body is the first through hole, an area enclosed by an inner edge of the first insulating part is the second through hole, and the first through hole at least partially overlaps with the second through hole;

the annular groove or the convex rib is located at an area that the second through hole faces.

3. The battery case according to claim 2, wherein the battery case further comprises a second welding point, the second cover body is configured to be welded with the tab of the battery cell to form the second welding point, and the second welding point faces an area enclosed by an inner edge of the annular groove or the convex rib.

4. The battery case according to claim 1, wherein the battery case is provided with at least one explosion-proof groove on at least one of the following positions:

a fifth surface of the bottom wall of the case body, the fifth surface is a surface of the bottom wall facing outwards;

a sixth surface of the side wall of the case body, the sixth surface is a surface of the side wall facing outwards;

the fourth surface of the second cover body.

5. The battery case according to claim 4, wherein when the at least one explosion-proof groove is disposed on the fifth surface of the bottom wall of the case body:

the at least one explosion-proof groove has a length of 0.2 times to 0.8 times a diameter of the bottom wall, the at least one explosion-proof groove has a width of 0.2 times to 0.8 times the diameter of the bottom wall, and the at least one explosion-proof groove has a depth of 0.2 times to 0.8 times a thickness of the bottom wall.

6. The battery case according to claim 4, wherein when the at least one explosion-proof groove is disposed on the sixth surface of the side wall of the case body:

the at least one explosion-proof groove extends in a thickness direction of the case body; the at least one explosion-proof groove has a length of 0.2 times to 0.8 times a thickness of the case body, the at least one explosion-proof groove has a width of 0.003 times to 0.2 times a perimeter of the side wall, and the at least one explosion-proof groove has a depth of 0.2 times to 0.8 times a thickness of the side wall.

7. The battery case according to claim 4, wherein when the at least one explosion-proof groove is disposed on the fourth surface of the second cover body:

the at least one explosion-proof groove has a length of 0.2 times to 0.8 times a diameter of the second cover body, the at least one explosion-proof groove has a width of 0.2 times to 0.8 times the diameter of the second cover body, the at least one explosion-proof groove has a depth of 0.2 times to 0.8 times a thickness of the second cover body.

8. The battery case according to claim 1, wherein the inner edge of the first insulating part is sealed with the first cover body and the second cover body by the adhesive dispense layer.

9. A battery characterized by at least comprising a battery cell and the battery case of claim 1, and the battery case wraps the outside of the battery cell.

10. The battery according to claim 9, wherein the battery cell comprises a first tab and a second tab, the first tab is connected to the first surface of the first cover body, and the second tab is connected to the third surface of the second cover body.

11. An electronic device characterized by at least comprising an electronic device body and the battery of claim 9, and the battery supplies electrical energy to the electronic device body.

* * * * *